(12) United States Patent
Johnson et al.

(10) Patent No.: US 9,868,044 B2
(45) Date of Patent: Jan. 16, 2018

(54) BALL SPIN RATE MEASUREMENT

(71) Applicant: EDH US LLC, Orlando, FL (US)

(72) Inventors: Henri Johnson, Windermere, FL (US);
Thomas Johnson, Plattekloof (ZA);
Robert William Rust, Somerset West (ZA)

(73) Assignee: EDH US LLC, Orlando, FL (US)

( * ) Notice: Subject to any disclaimer, the term of this patent is extended or adjusted under 35 U.S.C. 154(b) by 85 days.

(21) Appl. No.: 15/133,744

(22) Filed: Apr. 20, 2016

(65) Prior Publication Data

US 2016/0339320 A1 Nov. 24, 2016

Related U.S. Application Data

(63) Continuation of application No. 14/152,645, filed on Jan. 10, 2014, now abandoned.
(Continued)

(51) Int. Cl.
*A63B 69/36* (2006.01)
*G01S 13/58* (2006.01)
(Continued)

(52) U.S. Cl.
CPC .......... *A63B 69/3658* (2013.01); *G01S 7/285* (2013.01); *G01S 7/352* (2013.01);
(Continued)

(58) Field of Classification Search
CPC .......... G01S 7/352; G01S 13/50; G01S 13/58; G01S 13/582; G01S 13/586;
(Continued)

(56) References Cited

U.S. PATENT DOCUMENTS 3,747,105 A * 7/1973 Payne ................ G01S 3/52
342/418
5,700,204 A * 12/1997 Teder ................ A63B 24/0021
473/199
(Continued)

FOREIGN PATENT DOCUMENTS

EP 1698380 B1 10/2009
EP 1853362 B1 6/2010
(Continued)

OTHER PUBLICATIONS

"2.5: Technical Manual of the 215BP Phase-Lock Tracking Filter", BS250 Trajectory Analyzing System (Updated Version), (Oct. 1981), 27 pgs.
(Continued)

*Primary Examiner* — Peter M Bythrow
(74) *Attorney, Agent, or Firm* — Schwegman Lundberg & Woessner, P.A.

(57) ABSTRACT

Systems and methods for ball spin rate measurement are described. Some embodiments provide a method whereby a phase-demodulated difference signal of a projectile in flight is received, such as from a Doppler radar system. A first periodic component of the phase-demodulated signal is detected, the first periodic component having a plurality of bipolar pulses, with each of the pulses having a first portion during which an apparent speed of the projectile is greater than a nominal speed of the projectile, and each of the pulses having a second portion during which the apparent speed of the projectile is less that the nominal speed of the projectile. A period of the first periodic component is detected, and the spin rate of the projectile in flight is determined based on the period of the first periodic component.

20 Claims, 19 Drawing Sheets

Related U.S. Application Data

(60) Provisional application No. 61/751,182, filed on Jan. 10, 2013.

(51) Int. Cl.
| | |
|---|---|
| *G01S 7/35* | (2006.01) |
| *G01S 7/285* | (2006.01) |
| *G06F 1/16* | (2006.01) |
| *A63B 24/00* | (2006.01) |
| *A63B 71/06* | (2006.01) |

(52) U.S. Cl.
CPC ............ *G01S 13/58* (2013.01); *G01S 13/581* (2013.01); *G06F 1/1626* (2013.01); *A63B 71/0622* (2013.01); *A63B 2024/0034* (2013.01); *A63B 2071/0625* (2013.01); *A63B 2071/0694* (2013.01); *A63B 2220/35* (2013.01); *A63B 2220/803* (2013.01); *A63B 2220/805* (2013.01); *A63B 2220/806* (2013.01); *A63B 2220/833* (2013.01); *A63B 2220/89* (2013.01); *A63B 2225/20* (2013.01); *A63B 2225/50* (2013.01); *A63B 2225/52* (2013.01)

(58) Field of Classification Search
CPC ............ A63B 69/3658; A63B 2225/50; A63B 2220/17; A63B 2220/30; A63B 2220/31; A63B 2220/34; A63B 2220/35; A63B 2220/36
See application file for complete search history.

(56) References Cited

U.S. PATENT DOCUMENTS

| | | | | |
|---|---|---|---|---|
| 5,863,255 | A * | 1/1999 | Mack | A63B 24/0021 473/151 |
| 6,151,563 | A | 11/2000 | Marinelli | |
| 6,157,898 | A * | 12/2000 | Marinelli | A63B 43/00 473/569 |
| 6,244,971 | B1 * | 6/2001 | Mihran | A63B 24/0021 473/200 |
| 6,286,364 | B1 * | 9/2001 | Aoyama | A63B 69/3614 473/156 |
| 8,845,442 | B2 * | 9/2014 | Tuxen | A63B 24/0021 273/108.2 |
| 2002/0075475 | A1 * | 6/2002 | Holton | G01P 3/366 356/28.5 |
| 2002/0085213 | A1 * | 7/2002 | Yamamoto | A63B 24/0021 356/614 |
| 2002/0107078 | A1 * | 8/2002 | Collins | A63B 24/0021 473/152 |
| 2003/0103684 | A1 * | 6/2003 | Gobush | A63B 24/003 382/286 |
| 2004/0156035 | A1 * | 8/2004 | Rogers | G01P 3/366 356/28.5 |
| 2006/0008116 | A1 * | 1/2006 | Kiraly | G06T 7/20 382/103 |
| 2006/0169932 | A1 * | 8/2006 | Fukata | G01S 17/50 250/559.01 |
| 2007/0293331 | A1 | 12/2007 | Tuxen | |
| 2008/0139330 | A1 | 6/2008 | Tuxen | |
| 2008/0261711 | A1 | 10/2008 | Tuxen | |
| 2009/0075744 | A1 * | 3/2009 | Tuxen | A63B 24/0021 473/200 |
| 2009/0295624 | A1 | 12/2009 | Tuxen | |
| 2011/0275462 | A1 | 11/2011 | Saegusa et al. | |
| 2013/0304417 | A1 * | 11/2013 | Mooney | A63B 69/3614 702/153 |
| 2014/0191896 | A1 | 7/2014 | Johnson et al. | |

FOREIGN PATENT DOCUMENTS

| | | |
|---|---|---|
| EP | 1698380 B9 | 7/2010 |
| EP | 1853362 B8 | 7/2010 |
| WO | WO-2012069375 A1 | 5/2012 |
| WO | WO-2014011083 A1 | 7/2014 |
| WO | WO-2014110398 A1 | 7/2014 |

OTHER PUBLICATIONS

"U.S. Appl. No. 14/152,645, Non Final Office Action dated Oct. 23, 2015", 15 pgs.

"European Application Serial No. 14738159.4, Communication Pursuant to Rules 161(2) and 162EPC dated Aug. 19, 2015", 7 pgs.

"European Application Serial No. 14738159.4, Response filed Jan. 20, 2016 to Office Action dated Aug. 19, 2015", 8 pgs.

"International Application Serial No. PCT/US2014/011083, International Preliminary Report on Patentability dated Jul. 23, 2015", 8 pgs.

"International Application Serial No. PCT/US2014/011083, International Search Report dated May 9, 2014", 2 pgs.

"International Application Serial No. PCT/US2014/011083, Written Opinion dated May 9, 2014", 6 pgs.

"Wave impedance in free space", Wikipedia, [Online]. Retrieved from the Internet: <URL: http://en.wikipedia.org/wiki/Wave_impedance#Wave_impedance_in_free_space>, (Accessed Aug. 11, 2014), 3 pgs.

Kleinwaechter, H., "By means of electromagnetic waves to missiles Rotationsmessung—centimeter", presentation to aerodynamic meeting W/ Machine Translation, (Dec. 5, 1956).

Lolck, Jens-Erik, et al., "Spin Measurements", TERMA Elektronik AS, Ballistic Instrumentation Division, (1987), 7 pgs.

Tavares, G, et al., "Chapter 58: Golf Spin Decay Model Based on Radar Measurements", Science and Golf III, Proceedings of the 1998 World Scientific Congress of Golf, (1998), 464-472.

Vinogradov, S, et al., "Radar Cross-Section Studies of Spherical Lens Reflectors", Progress in Electromagnetics Research, Pier 72, (2007), 325-337.

"European Application Serial No. 14738159.4, Extended European Search Report dated Jul. 20, 2016", 8 pgs.

Bretthorst, G Larry, "", Lecture Notes in Statistics vol. 48, Bayesian Spectrum Analysis and Parameter Estimation, Springer-Verlag, (1988), 220 pgs.

* cited by examiner

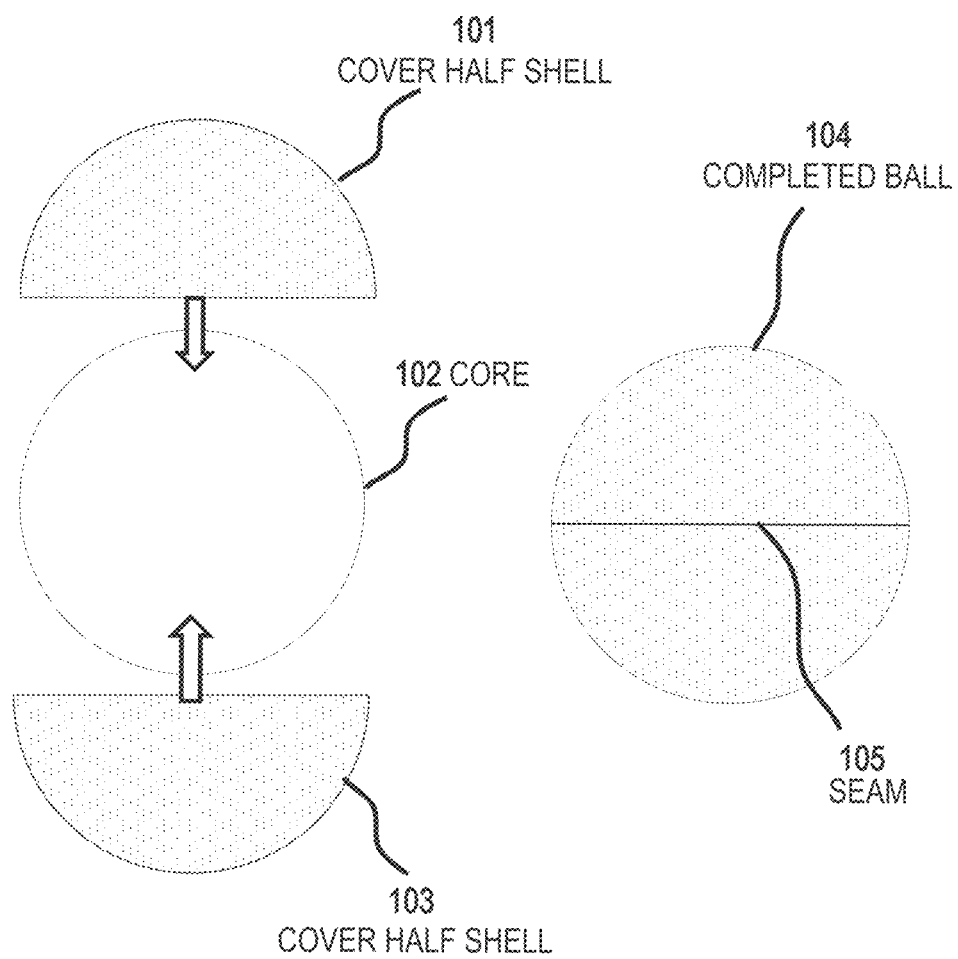
FIG. 1 - GOLF BALL CONSTRUCTION (SIMPLIFIED)

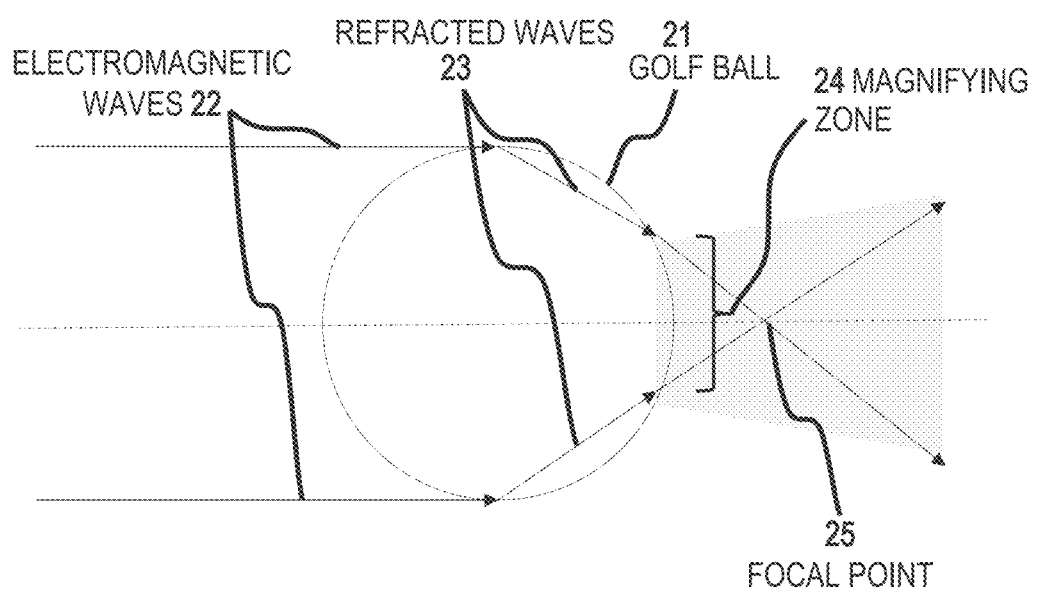
FIG. 2 - GOLF BALL LENS EFFECT

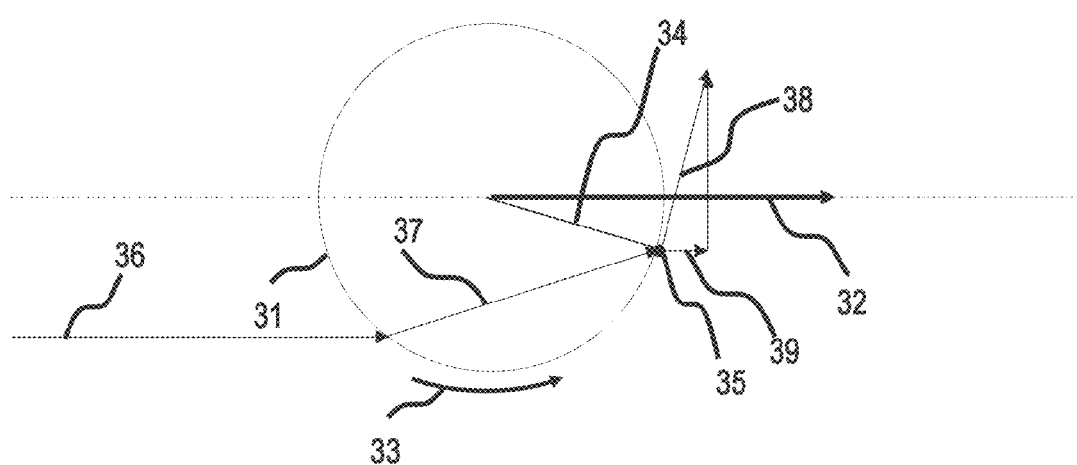
FIG. 3 –
DOPPLER VELOCITY OF A FEATURE IN THE MAGNIFICATION ZONE

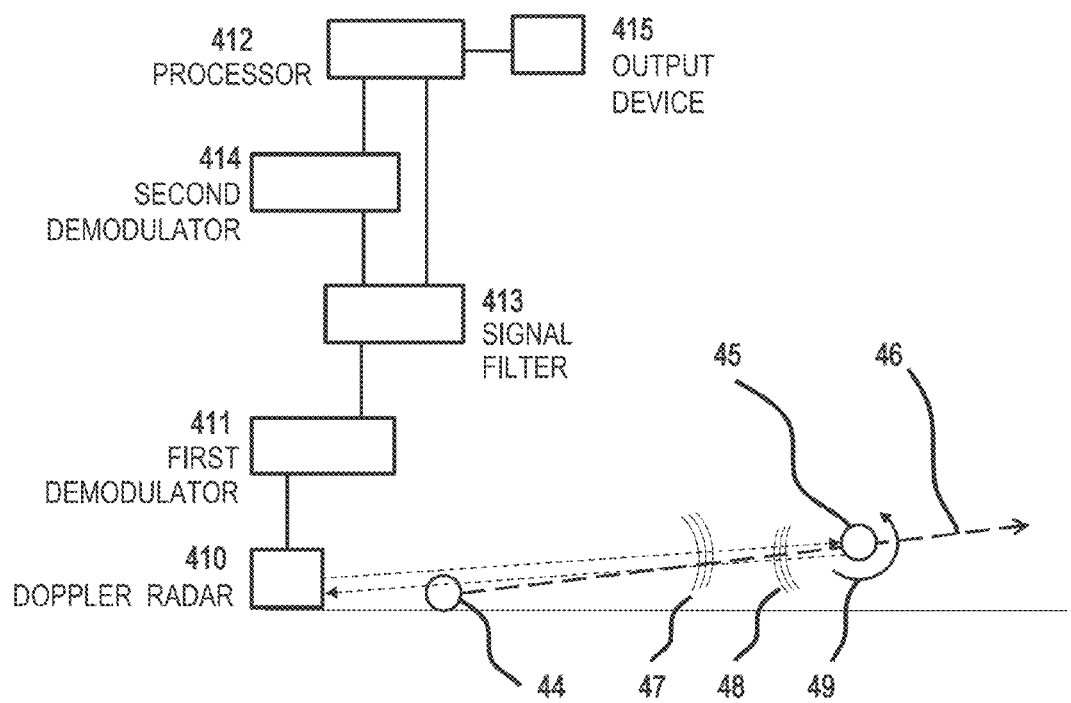
FIG. 4 – BALL SPIN MEASUREMENT SYSTEM

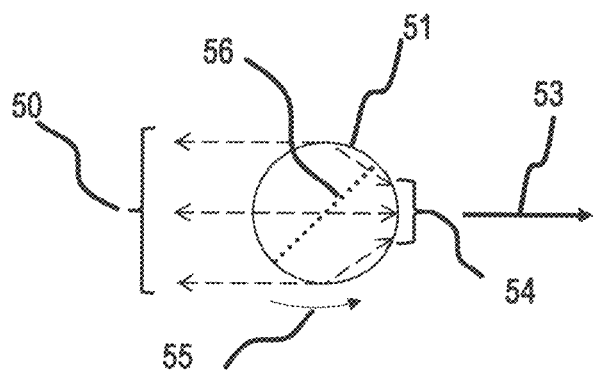
FIG. 5A - GOLF BALL LENS WITH SEAM
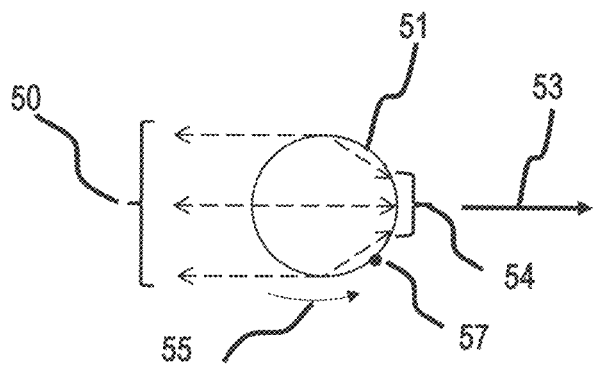
FIG. 5B - GOLF BALL LENS WITH SURFACE TARGET

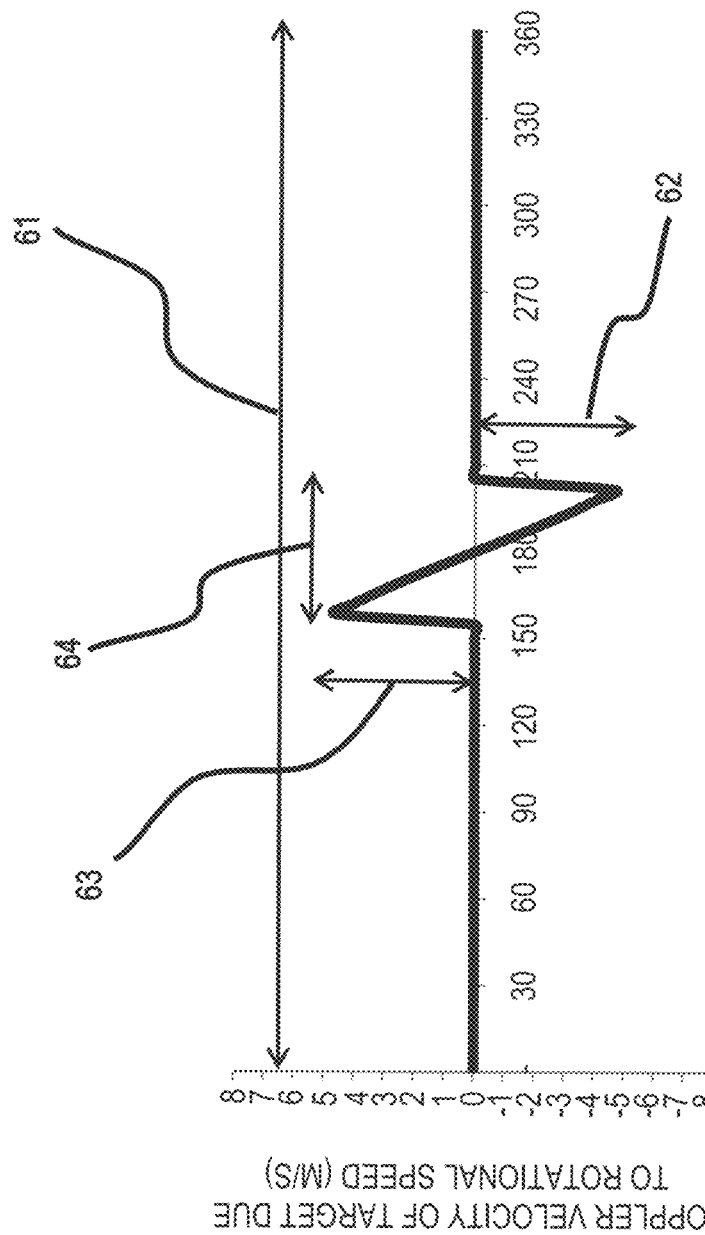
FIG. 6 -
RELATIVE DOPPLER VELOCITY OF A MAGNIFIED
TARGET AGAINST BALL ROTATIONAL POSITION

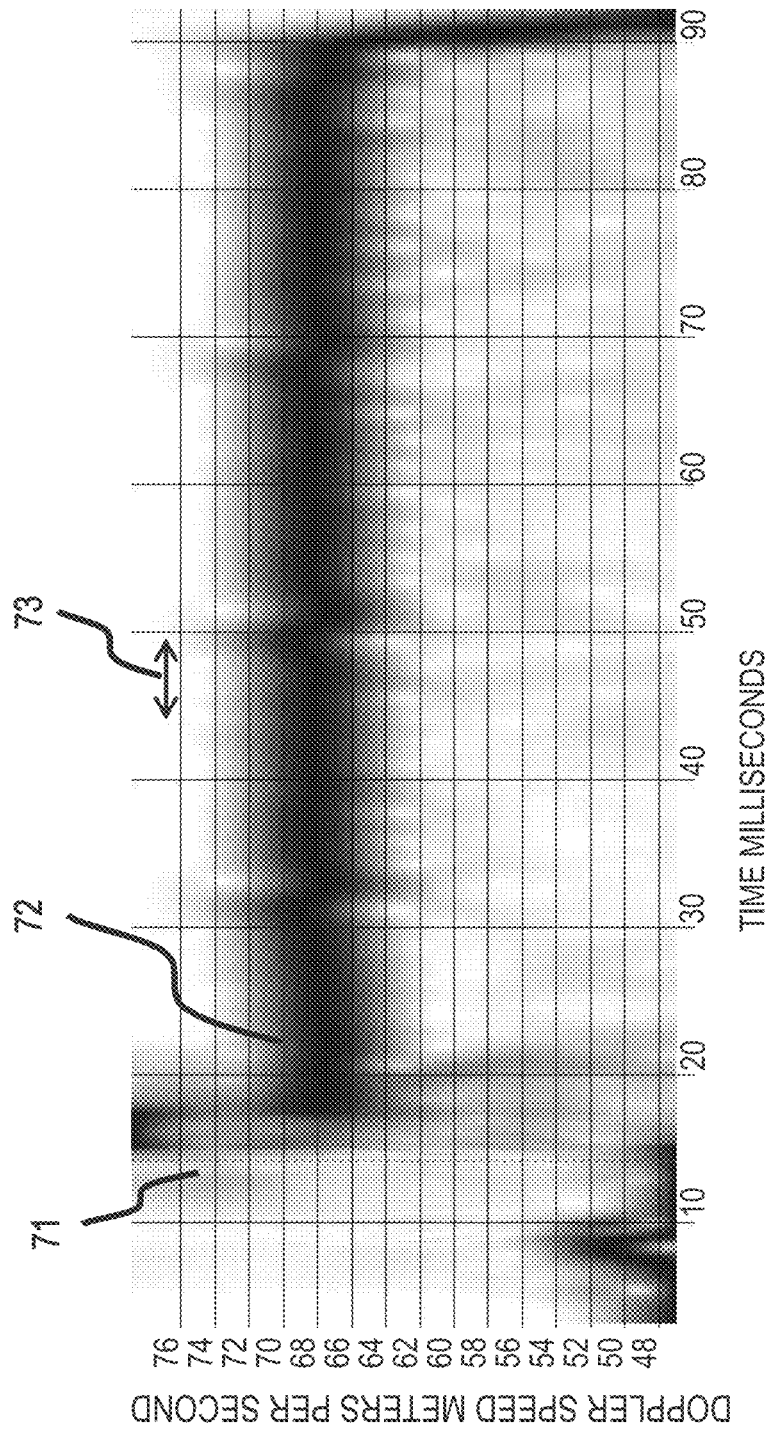
FIG. 7 – MEASURED DOPPLER VARIATIONS OF A MARKED GOLF BALL

PHASE DEMODULATED SIGNAL OF A GOLF BALL DOPPLER SIGNAL WITH SPIN OF 3300 R.P.M. (55 HERTZ)

FIG. 9 –
FREQUENCY ANALYSIS OF DEMODULATED DOPPLER SIGNAL OF A GOLF BALL WITH SPIN OF 3300 RPM (55 HERTZ)

FIG. 10 - METHOD STEPS

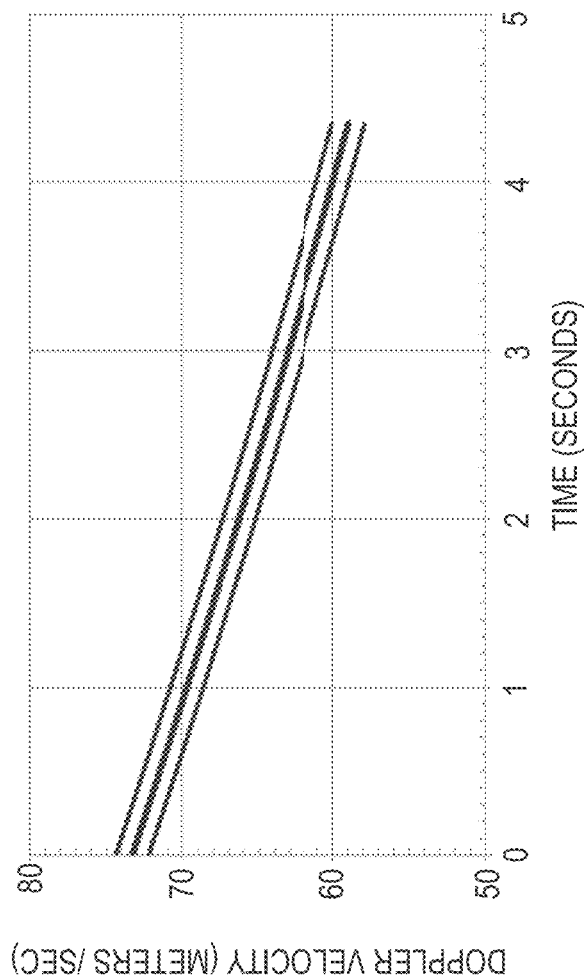
FIG. 12 – VELOCITY AND PHASE MODULATION SIDEBANDS

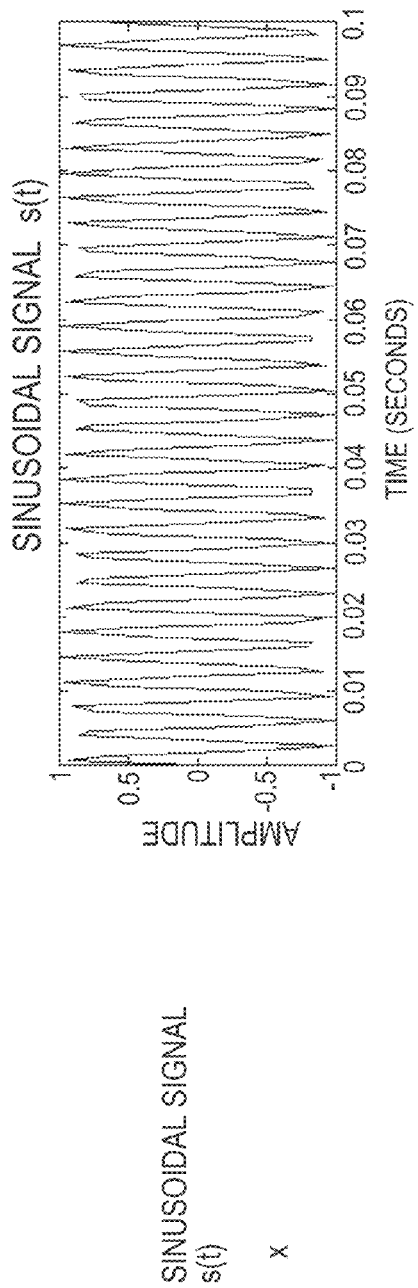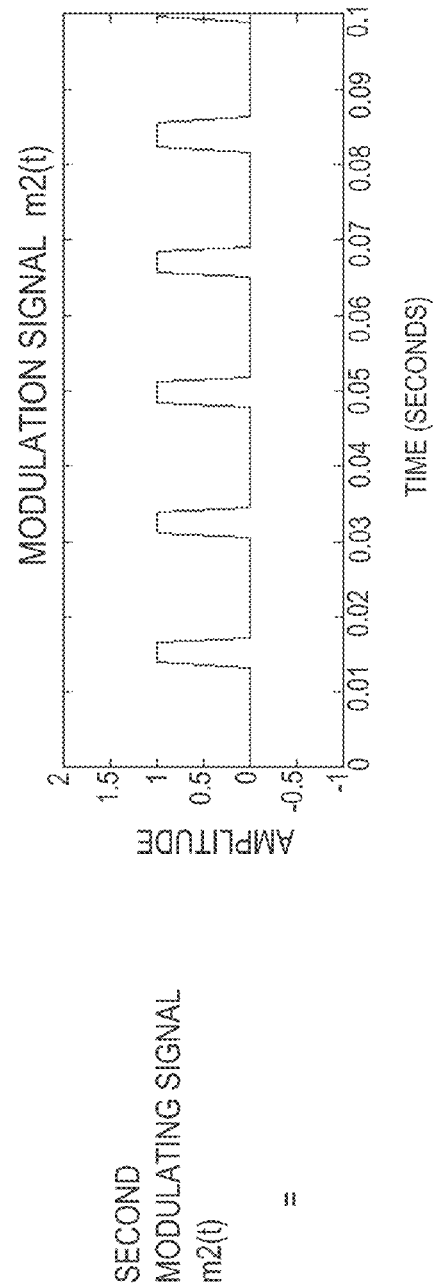

PRODUCT SIGNAL
p(t)           +

NOISE
n(T)           =

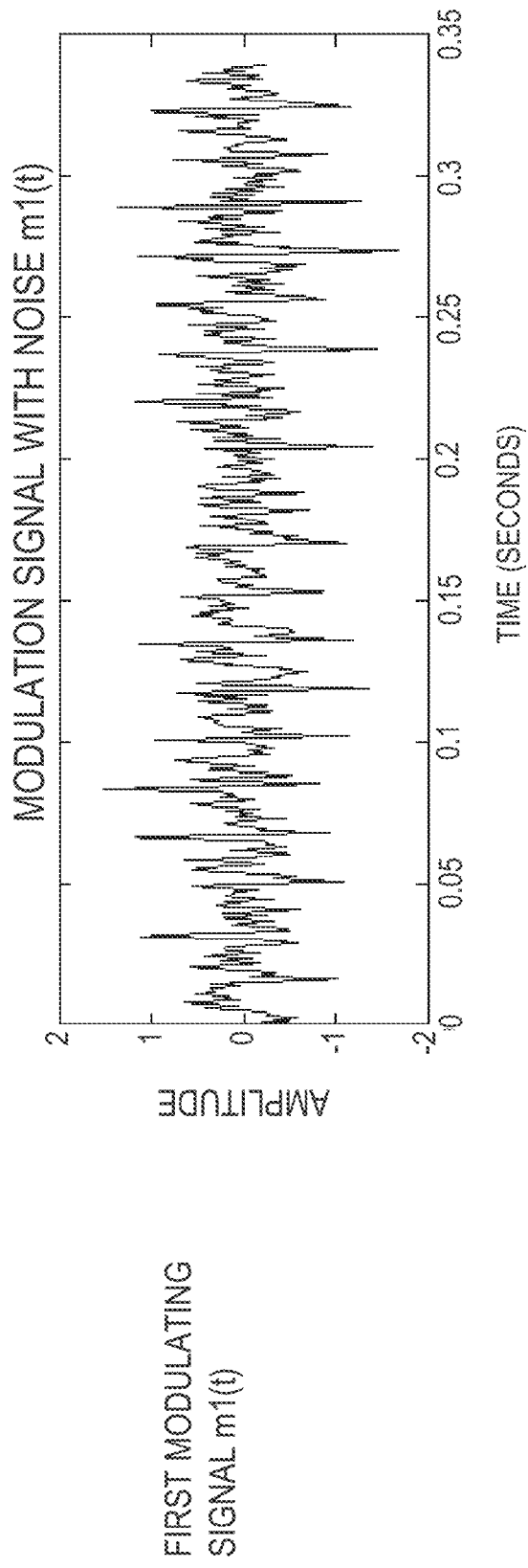

BALL SPIN RATE MEASUREMENT

RELATED APPLICATIONS AND CLAIM OF PRIORITY

This application is a continuation of U.S. patent application Ser. No. 14/152,645, inventors Johnson et al, entitled "Ball Spin Rate Measurement" filed Jan. 10, 2014, which claims the benefit under 35 U.S.C. 119(e) to U.S. Provisional Patent Application Ser. No. 61/751,182, inventors Johnson et al, entitled "Ball Spin Rate Measurement" filed Jan. 10, 2013, which are incorporated herein by reference in their entirety and made a part hereof.

BACKGROUND

The trajectory of a golf ball is mainly determined by the initial conditions of velocity, direction, and spin rate.

Many systems in the golf ball launch monitor category which is intended to measure spin rate depend on applying marks to the surface of the golf ball. This limits the utility of these systems due to the effort required and makes it unacceptable when a launch monitor is used for example on the tee at a professional golf tournament where ball marking is not possible.

Thus, it would be beneficial to provide a means to reliably and accurately measure the spin rate of an unmarked ball. It would be further beneficial to provide a means to measure the spin rate of an unmarked ball using Doppler radar.

SUMMARY

In one example, a method of determining a spin rate of a projectile in flight includes receiving a reflected signal from the projectile in flight, the reflected signal being a reflected portion of a microwave signal incident on the projectile in flight; mixing the received signal with a comparison signal based on the microwave signal to yield a difference signal; demodulating the difference signal to generate a demodulated signal including at least one periodic component indicating phase variations between the received signal and the comparison signal; detecting a first periodic component of the demodulated signal, the first periodic component including a repeating bipolar pulse having a first portion during which an apparent speed of the projectile is greater than a preceding speed of the projectile, the bipolar pulse having a second portion during which the apparent speed of the projectile is less than the preceding speed of the projectile; determining a period of the first periodic component; and determining the spin rate of the projectile in flight based on the period of the first periodic component.

In one embodiment, a system includes a signal transmitter to transmit a microwave signal toward a projectile in flight; a signal receiver to receive a reflected signal from the projectile in flight, the reflected signal being caused by at least a portion of the microwave signal incident on the projectile in flight; a signal mixer to mix the received signal with a comparison signal based on the transmitted microwave signal to yield a difference signal; a demodulator to demodulate the difference signal to generate a demodulated signal including at least one periodic component indicating phase variations between the received signal and the comparison signal; and a frequency analyzer to detect a first periodic component of the demodulated signal, the first periodic component including a first time portion indicating a first apparent speed of the projectile greater than a nominal speed of the projectile, and including a second time portion indicating a second apparent speed of the projectile less than the nominal speed of the projectile, the frequency analyzer to determine a period of the first periodic component, and to determine the spin rate of the projectile in flight based on the period of the first periodic component.

DESCRIPTION OF THE DRAWINGS

The example embodiments may be better understood, and its numerous features and advantages made apparent to those skilled in the art by referencing the accompanying drawings and descriptions provided in the Detailed Description. For ease of understanding and simplicity, common numbering of elements within the illustrations is employed where an element is the same in different drawings. In the drawings, which are not necessarily drawn to scale, like numerals may describe similar components in different views. In some instances, different numerals may describe similar components in different views. Like numerals having different letter suffixes may represent different instances of similar components. The drawings illustrate generally, by way of example, but not by way of limitation, various embodiments discussed in the present document.

FIG. 1 illustrates aspects of a golf ball construction, in accordance with example embodiments.

FIG. 2 illustrates aspects of a golf ball lens effect resulting from electromagnetic wave refraction, in accordance with example embodiments.

FIG. 3 illustrates aspects of Doppler velocity of a target in a magnification zone, in accordance with example embodiments.

FIG. 4 illustrates aspects of a ball spin measurement system, in accordance with example embodiments.

FIGS. 5A-5B illustrate aspects of lens action during ball rotation, in accordance with example embodiments.

FIG. 6 illustrates aspects of Doppler velocity of a magnified target, in accordance with example embodiments.

FIG. 7 illustrates aspects of measured Doppler variations with a marked target, in accordance with example embodiments.

FIG. 12 is a graph illustrating aspects of velocity and phase modulation sideband curves, in accordance with example embodiments.

FIGS. 13A through 13E and FIGS. 14A through 14E illustrate graphs relating to aspects of golf ball spin measurement, in accordance with example embodiments.

DETAILED DESCRIPTION

Figure 8:
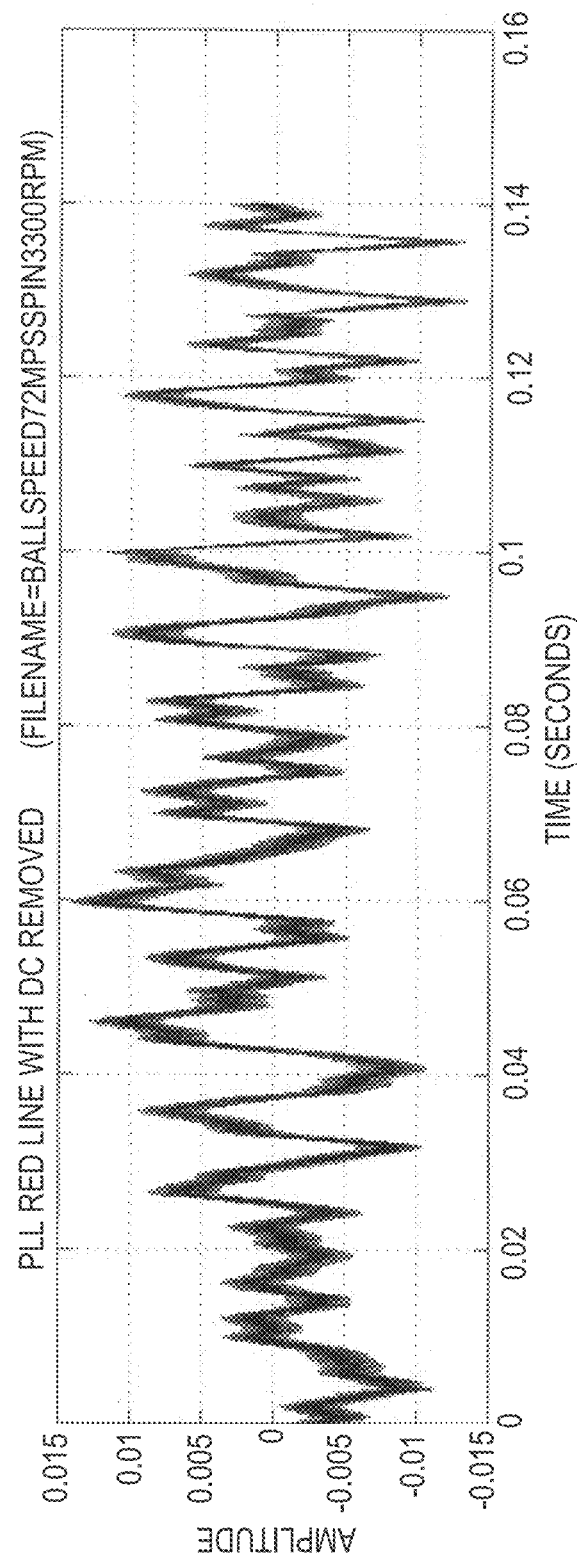
FIG. 8 illustrates aspects of phase demodulated signals, in accordance with example embodiments.

How Spin Relates to a Golf Ball Trajectory

The trajectory of a golf ball is determined by its launch conditions, atmospheric conditions, and physical characteristics of the ball itself. A golfer aims to launch the ball with a speed, angles, and spin to achieve his objectives during a golf game. He uses a chosen golf ball and is subject to the prevailing atmospheric conditions.

Spin (rotational velocity) plays an important part in a ball's flight trajectory. Modern golf balls have carefully crafted dimple patterns to create optimal air flow over the surface of the ball. Spin results in an aerodynamic force that operates in a direction perpendicular to the ball's direction. The component of spin in the vertical plane is called backspin. The aerodynamic force acting in the vertical plane is referred to as "lift" and it has the important effect of opposing the force of gravity, causing the flying ball to fall more slowly and achieving greater flight (carry) distance before hitting the ground. The component of spin in the horizontal plane is called sidespin. Sidespin creates a force in the horizontal plane perpendicular to the ball's direction. This horizontal force will cause the ball trajectory to curve left or right depending on the spin direction in the horizontal plane.

Air friction will cause the ball to lose both forward and rotational speed. The spin will therefore decay over the flight time.

Why Spin is Measured

To improve golf equipment and golfers skills it is useful to measure the launch and trajectory of a golf shot. One of the data items measured is the golf ball spin at launch.

How Spin is Measured

Over the years, equipment and methods have been devised to measure golf ball spin, usually called launch monitors or ball-tracking systems. Methods include golf balls instrumented with radio or sound transmitters, or remote sensing devices including radar type sensors, cameras and other imaging devices, and laser devices. Most systems measure only launch spin, and not the decay of spin along the flight path. Indirect methods are also used to estimate spin from fitting the measured trajectory to a mathematical model that includes spin as a variable Some camera based systems require the golf ball to be marked in a predetermined way for spin to be measured. Other camera systems are able to work with regular unmarked golf balls. Radar sensors detect spin-induced modulations of the Doppler shifted signal reflected from the golf ball. Indirect methods are also used to estimate spin from the measured trajectory, based on a mathematical model that includes spin as a variable.

Construction of a Golf Ball

FIG. 1 illustrates the construction of a typical modern golf ball. An inner core 102, which may be a composite of more than one concentric layer, is covered by an outer shell which is fabricated as two hollow hemispheres 101 and 103. This outer shell is made of a tough impact and abrasion resistant material and has a dimpled outer pattern. The shells 101 and 103 are bonded together around the core 102 to form the finished ball 104. This method creates a line where the two shell halves meet, called the seam 105. Some ball manufacturers print text or marks to indicate the seam position.

Set-Up of a Doppler Radar to Measure a Golf Ball

In one embodiment, a Doppler radar to measure a golf ball launch and flight is positioned on or near the ground, several feet behind the tee, and aimed at the golf ball along the direction that it will be launched. This position ensures that it is safe from the club and the ball, and allows the radar field of view to cover much of the ball's trajectory. It also ensures that the ball travels more or less directly away from the radar with small parallax effects on the Doppler shift, and which can be compensated for if needed.

A Doppler Radar Suited to Track a Golf Ball

One way to construct a Doppler radar for golf ball tracking is by using a low power continuous wave (CW) signal source delivering a signal of approximately several milliwatts of power at a frequency of around 10.525 GHz into a transmitting antenna with approximately 20×20 degrees coverage in the horizontal and vertical directions. Combined with this, at least one, but typically 3 or more receivers each comprising a receiving antenna with field of view corresponding to that of the transmitting antenna and receiver circuitry that produces a Doppler signal, which is the filtered product of the received signal and the transmitted signal. The received Doppler signal(s) can be sampled by a processing unit able to analyze the signals to extract ball speed, ball directions, and other important data.

Doppler Shift from a Golf Ball

Assuming that the golf ball is travelling approximately directly away (or towards) a Doppler radar, the signal reflected back to the radar from the ball will be Doppler shifted. The phenomenon of Doppler shift is well known in the fields of electromagnetic radiation and sound.

The Doppler shift imparted to a constant frequency radar signal is calculated as $$f_{DOPPLER} = V_{TARGET}/(2*C*f_{RADAR})$$

where $V_{TARGET}$ is the speed relative to the radar, C is the speed of electromagnetic radiation (approximately $3 \times 10^8$ m/s) and $f_{RADAR}$ is the frequency of the radar signal.

In a non-spinning ball, all the parts of the ball visible to the radar are travelling at the same speed relative to the radar and contribute the same amount of Doppler shift.

In a spinning golf ball, various parts of the ball move at different speeds relative to the radar, due to the rotational movement combined with the translational movement. The reflected signal will exhibit Doppler spreading around the average ball speed. The amount of spread is proportional to the spin rate.

Spin Induced Modulation of the Reflected Doppler Signal

The rotational motion of a practical radar target with at least one non-homogeneous feature will cause changes to the reflected Doppler signal. The changes manifest as modulation of the Doppler signal, and are periodic in nature with a rate being proportional to the target's rotation rate (or spin rate). Such Doppler signal may have amplitude modulation (AM) and/or angle modulation. Angle modulation can be frequency modulation (FM) or phase modulation (PM).

Golf Ball Features Causing Spin Modulation of the Doppler Signal

The rotational motion of a golf ball modulates the reflected Doppler signal. On an unmarked golf ball the set of dimples, individual dimples, or surface marks such as the manufacturer's logo printed on the ball surface have been mentioned as the mechanisms that cause the modulation effect. Several methods are also used to mark golf balls with for example metal tape to magnify the modulating effect of the spinning ball.

Golf Ball as a Radar Target

A golf ball is generally a weak radar target due to its small size and composition. It is not made of a conductive material but instead reflects energy due to the change in dielectric characteristics at the air to ball interface. In this way, only a part of the incident signal energy reflects from the surface of the ball, and the remainder part propagates into the ball, refracting in the ball body and reflecting once more when it reaches the far surface of the ball.

Golf Ball Acting as a Lens

A golf ball can act as a lens to magnify the modulating effect of a feature on or near the surface of the ball. The feature can be a deliberate mark such as a small metal foil disk on the surface, or be a construction feature of the ball such as the ball seam.

Embodiments of the invention are based on the principle that a golf ball is similar to an optical ball lens. The refraction index of the typical polymers used as golf ball core materials causes the ball to act like a lens with focal point near the opposing surface of the ball.

With reference to FIG. 2, the lens effect is discussed below in the context of a Doppler radar measuring a golf ball travelling away from it.

The lens effect is caused as follows. A golf ball 21 composed of typical synthetic plastic materials may cause the electromagnetic waves 22 to refract while propagating inside the ball. The paths of the refracted waves are illustrated as 23. The refraction result in the wave paths to converge at a focal point 25 which can be on or near the opposing ball surface. A magnifying zone 24 is created due to the lens effect.

The lens effect has the following beneficial and particular characteristics:

The size of a feature on or near the surface of the golf ball is magnified to an observer or measuring instrument such as a radar, on the opposing side of the golf ball.

The magnifying effect also applies to the apparent speed and hence the Doppler effect of the feature.

The magnifying effect applies only while the feature is on the side of the ball away from the observer or radar, and only in the zone that the lens allows. For the remainder of time, the feature will be obscured while behind the ball, or be very small compared to the magnified image of the feature. Correspondingly the modulating effect on the Doppler signal will be small compared to the effect when the feature is in the lens magnifying zone.

The time instant when the Doppler signal is modulated corresponds to when the feature is traversing the far side of the ball. This unique characteristic can be taken as scientific proof that the golf ball acts as a lens.

The magnified feature will modulate the Doppler signal in a particular manner. It will cause an increase in the amplitude of the Doppler return signal due to the increased apparent size. It will also, when the feature enters the lens zone, initially retard (delay) the phase of the Doppler return signal and after passing the furthest back point will continue to advance (bring forward) the phase of the Doppler signal. Retarding the phase will also manifest a lowering in reflected frequency while a phase advance will cause an increase in the reflected frequency. It can be shown that the lowering of the reflected frequency from a golf ball travelling away from a Doppler radar is equivalent to increasing the speed apparent to the radar, and vice versa.

This is a second unique characteristic of the modulating effect consistent with the assertion that a golf ball acts as a lens.

The Golf Ball Seam

The seam of a golf ball is formed where two halves of the golf ball outer cover is joined. Some golf balls have clearly visible seams while others are manufactured with an interlocking pattern between the two halves making the seam less obvious. Whatever the method of construction, an equatorial joint between the two halves is present. Sometimes manufacturers may call balls "seamless", but it simply means that the joint line is not straight but has an interlocking pattern with no visible break line in the dimple pattern. Broadly speaking however the joint still forms an equatorial band around the ball with or without small local variations.

How the Seam Modulates the Doppler Signal

With reference to FIG. 5A, a seam 56 of a golf ball is a symmetrical non-homogeneous feature on the ball that can modulate the Doppler signal reflected from a spinning golf ball.

As a simplified analysis, consider an unmarked golf ball with only back spin 55 around a spin axis that is perpendicular to the ball flight direction 53. Also assume that the ball seam is oriented so that the spin axis is in the plane of the seam. In this configuration, the seam will cause a modulation effect at twice the spin rate due to its symmetry; the opposing halves of seam will alternately pass through positions of reflection that can impart modulation on the radar signals 50. This phenomenon is similar to the case where a single slot in the base of an artillery projectile produces a modulating effect on a Doppler signal at twice the projectile spin rate.

The effect can be generalized to other practical orientations of spin axis and seam orientations. It is expected that the seam can cause modulation of the Doppler signal at double the spin rate for all cases except if the seam is precisely perpendicular to the spin axis in which case its modulation effect will be minimal. In a random experiment, it can be expected that the seam will cause the double rate modulation far more often than not, providing a practical means for golf ball spin measurement. In the minority of cases where the seam does not contribute detectable spin modulation, secondary or alternative non-homogeneities such as print or other marks can cause modulation at a rate of once per rotation.

Spin Induced Modulation of the Reflected Doppler Signal

The secondary periodic or random motions of a travelling body measured by a Doppler radar will cause modulation effects in the Doppler signal. These secondary motions can be for example a rotation (spin). The modulation will appear as amplitude and/or phase modulation on the Doppler signal.

Determination of the spin rate using demodulation of the Doppler signal described herein provides an improvement over conventional detection of spin rates using amplitude modulation or phase modulation.

FFT-Analysis of Demodulated Doppler

FIG. 12 illustrates the a phase modulated Doppler signal of a spinning projectile whose speed typically decreases with time due to factors such as atmospheric drag.

Figure 9:
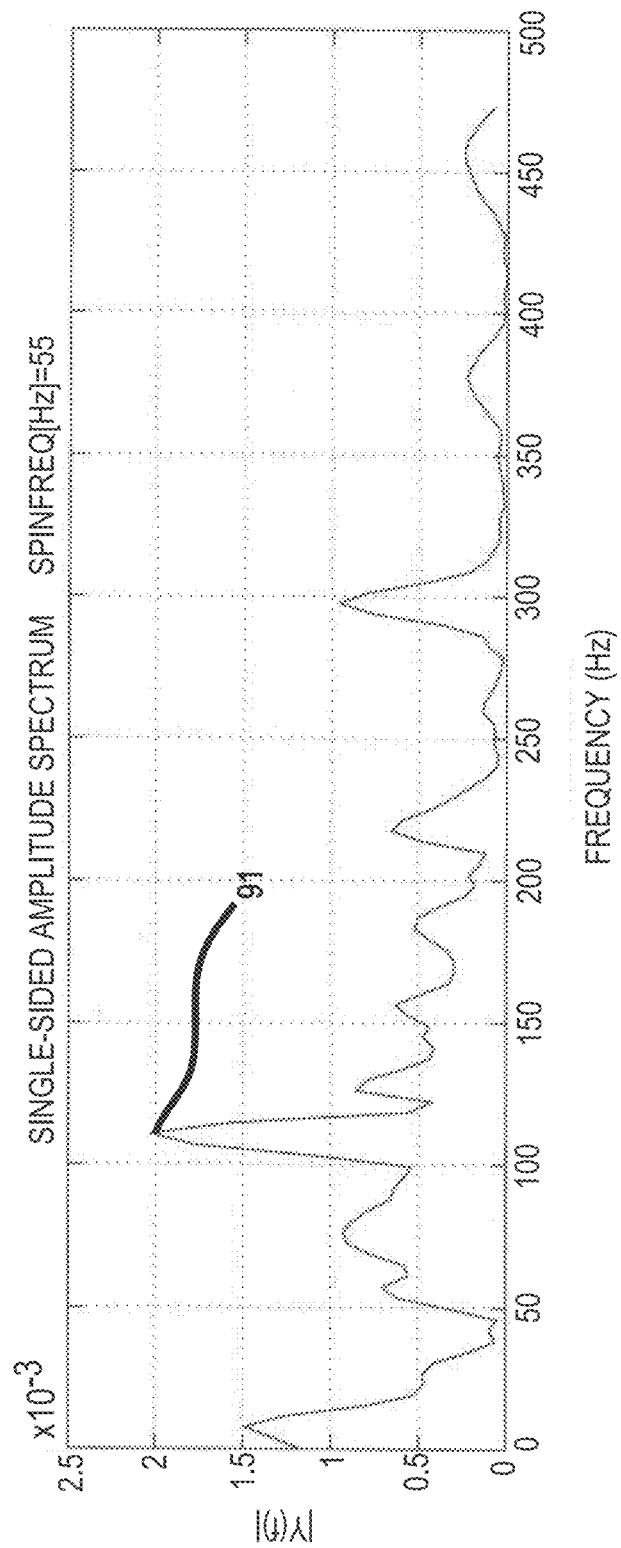
FIG. 9 illustrates aspects of frequency analysis, in accordance with example embodiments.

A signal representing the time-varying modulation induced by the projectile's spin can be extracted as the error signal of a Phase Lock Tracking Filter [REF. 1]. FIG. 8 illustrates the error signal demodulated from the Doppler signal from a real golf ball, whose spin was determined by an independent instrument as approximately 3300 revolutions per minute. The frequency of spin can be determined by any known method of frequency analysis on this error signal. FIG. 9 illustrates a frequency analysis of the error signal of FIG. 8. The principal oscillatory frequency 91 can be seen at approximately 110 Hz (cycles per second). This is equal to 6600 cycles per minute, which is twice the actual ball spin rate, which can be expected if the modulation is caused by the ball seam as discussed before.

Modulation Sidebands

A modulating signal which is a pure single frequency can be used to cause Amplitude or Phase Modulation on a carrier signal. The modulation will create sidebands spaced symmetrically about both sides of the frequency of the carrier signal, at distances equal to the multiples of the frequency of the modulating signal. Amplitude modulation creates only one pair of sidebands spaced at precisely the modulation frequency below and above the carrier frequency. Angle modulation is more complex and creates multiple sideband pairs around the carrier frequency. These pairs are spaced at harmonic multiples of the modulating frequency above and below the carrier frequency. The relative amplitude of each pair is dependent on the intensity (degree) of modulation usually called the modulation index. If the modulation index is small, higher order harmonics can be very small with only a first pair perceptible, practically appearing similar to pure amplitude modulation.

Characteristics of Modulation with the Ball Lens Effect

Consider an unmarked golf ball travelling away from a Doppler radar at speed VB, and with a spin rate S. Assume for the moment that the ball has at least one non-homogeneous feature with distinctive reflective or dielectric characteristics on its surface, and that passes approximately through the point of the ball furthest away from the radar once per rotation.

Assume also that the ball is far enough from the radar that any two lines from the body of the ball to the position of the radar is approximately parallel to each other.

Reflecting, Scattering and Propagation at the Air to Ball Boundary

Incident microwave radiation arrives at the ball and at any particular point the direction of the incident radiation forms an angle TETA1 with the normal to the ball surface.

Where the radar signal reaches the ball, a part of the microwave energy will reflect or scatter from the surface and the remainder will propagate into the ball material.

The fraction of energy reflected can be calculated using the knowledge of the dielectric constants of the golf ball and air as follows:

E reflected+scattered=reflection coefficient R=(Z1−Z0)/(Z1+Z0) and where Z0=characteristic impedance of air, and the characteristic impedance of the golf ball elastomer Z=Z0/SQRT(EPS2) where EPS2=relative dielectric constant of the ball elastomer. As n2 (the refraction coefficient in the ball elastomer) is equal to the square root of the relative dielectric constant EPS2, the reflection coefficient can be calculated as:

$$R=(1-n2)/(1+n2), \text{ with } n1 \text{ the refraction index of air which is approximately unity.}$$

If ETA2=1.8, the reflection coefficient is approximately 0.28. This means that 72% of the incident energy propagates across the air/ball boundary into the ball.

Refraction in the Ball

The elastomer forming the core of the golf ball is typically a resin acrylate with a relative dielectric constant EPS of between 2.7 and 4.5. For further discussion assume a ball with dielectric constant of 3.24 is used. The dielectric constant of air is approximately equal to 1.

The refractive index of any medium is equal to the square root of the medium's relative dielectric constant. Hence the refractive index of air (n1) is approximately 1.00 and the refractive index of a typical ball (n2) is approximately 1.8.

A microwave signal arriving at a point A has a direction TETA1 relative to the normal to the ball surface. The part of the signal propagating into the ball body will be refracted according to Snell's law: sin(TETA1)/sin(TETA2)=n2/n1 where TETA1 is the incident angle (relative to the normal), TETA2 is the angle of the refracted signal, n1 is the refractive index of air, and n2 is the refractive index of the ball material. From this law it can be shown that, because n2 is larger than n1, the angle TETA2 is smaller than TETA1, meaning that the path of the signal will be bent in a direction nearer to the center of the ball. This refraction process is the basis for the ball acting as a lens.

Focal Length of a Ball Lens

The focal point of a ball lens is at the effective focal length (EFL) calculated from the relationship EFL=n2*R/(2*(n2−1)), where EFL is the effective focal distance defined from the lens centre to the focal point, R=radius of the ball, and n2 is the refractive index of the core material. Using the above formula it is easy to show that a ball lens made of a material with refractive index of 2 will have an EFL equal to the radius of the ball R. This means that the focal point will be on the surface of the ball. For other practical values of refractive index, the focal point will not be on the ball surface, but will fall in a narrow range of possible positions near the surface. The result is that an object such as a marker or other detectable feature on the surface will appear "magnified" when viewed by the radar on the opposite side of the ball.

Doppler Effect Generated by a Magnified Feature on the Ball Surface

A feature on the golf ball with reflective characteristics distinguishable from the rest of the golf ball can be referred to as a "target".

The rotation of the spinning ball can cause a target to move into the area or zone where, from the perspective of the observing Doppler radar, it will be magnified due to the lens effect.

Two mechanisms that can act to cause a target magnified by the lens effect to modulate the Doppler signal reflected from the ball are now described. In some embodiments, for simplicity assume that the target is on the surface of the ball, that the ball spins around an axis perpendicular to the line between the Doppler radar and the ball center, and that the target is positioned on the equator relative to the spin axis of the ball. These simplifications can be relaxed later to generalize the method.

Mechanism 1

FIG. 5B illustrates a golf ball 51 with simple backspin 55 around a spin axis perpendicular to the ball flight direction 53.

The spin 55 causes a feature on the ball 57 (the "target") to move in a circle in a plane perpendicular to the spin axis of the ball. The ball rotation will cause the target to pass through the magnification zone 54 on the far side of the ball where its reflection will be magnified by the ball's lens action on the radar signals 50.

While the target is outside the magnifying zone, all the elements of the ball such as its front surface, the collection of individual dimples, the target itself (with unmagnified response) and other features will collectively reflect signals towards the radar. The collective refection will be spatially centered on the side of the ball closest to the radar.

When the target moves into and through the magnifying zone, its reflection becomes dominant. FIG. 6 illustrates the relative Doppler velocity of a dominant target progressing through the magnification zone.

When in the magnification zone, the target's is on the far side of the ball, and this creates an effect of rapid forward movement from the previous "average" collective position of the ball reflectors to a new more distant position. This apparent position change causes an equal rapid phase change in the reflected signal that is akin to a rapid momentary speed increase 63. A converse effect happens when the target moves out of the magnifying zone, when the average position of the collection of reflectors on the ball will appear to move backwards towards the radar, creating a rapid phase advance (or apparent negative speed) change 62 in the reflected signal. This effect will be repeated periodically every for every rotation of the ball. This process modulates the phase of the reflected signal at the rate at which a target rotates, its effect being enhanced by passing through the magnifying zone.

Another feature of the target's enhanced modulating effect while transiting the magnification zone is that the magnifying effect is only active for a part of the ball's rotation. This is illustrated by the span 64 of the modulation relative to a full 360 degree rotation 61 of the ball.

Amplitude modulation can also be expected due to the magnified target size compared to the average of the ball's reflections.

Thus, a feature of this process is that it modulates the phase in a way that initially increases the ball's apparent away speed momentarily followed by a momentary decrease in the ball's apparent speed. This is unique to the ball lens effect.

FIG. 7 shows the measured Doppler return signal from a marked golf ball. The ball is launched at the time indicated by 71. The average Doppler speed representing the ball's forward motion is indicated as 72. The target marker transits periodically through the magnifying zone causing visible periodic variation patterns for example 73.

Mechanism 2

FIG. 5B illustrates a golf ball 51 with simple backspin 55 around a spin axis perpendicular to the ball flight direction 53.

The spin 55 causes a feature on the ball 57 (the "target") to move in a circle in a plane perpendicular to the spin axis of the ball. The ball rotation will cause the target to pass through the magnification zone 54 on the far side of the ball where its reflection will be magnified by the ball's lens action on the radar signals 50.

While the target is outside the magnifying zone 54, all the elements of the ball such as its front surface, the collection of individual dimples, the target itself (with unmagnified response) and other features reflect signals towards the radar.

When the target moves into and through the magnifying zone 54, its reflection becomes dominant. When it enters the magnifying zone, its velocity vector VT has a component parallel to the radar direction and a component in the radar direction. This second component is initially in the direction of the ball's movement and its relative speed is therefore the sum of the ball's apparent speed and the magnitude of the component.

The magnifying effect of the ball not only increases the apparent size of the target but also its speed.

A simplified model of the process, treating the process with optical ray theory, is as follows:

Let
S=ball rotational rate in Hz
R=radius of the ball, in meters
n2=refractive index of ball core
n1=refractive index of air (approximately 1.00)

The path L of the incident radar signal reaches the ball at position P1.

The angle between the signal path and the normal to the ball surface at this position is A1.

The angle of the refracted path to the normal is AR, and is calculated from Snell's law as $\arcsin[(n1/n2)*\sin(A1)]$.

The distance q traversed by the refracted signal to the opposite boundary of the ball at point P2 is calculated as $R*\sin(\pi-2*AR)/\sin(AR)$. For the discussion, assume that the target is at this point P2.

At the ball center, the angle between the center line F and a line to point P2 is A2. A2 can be calculated as 2*AR−AI.

The target has a tangential speed VR=2*π*S*R meters per second, where S is the ball spin rate in rotations per second.

The component of this speed in the direction of the line between the ball and the radar is calculated as VDOPP=VR*sin(A2).

Solving for A2 and AR in terms of AI and n2, the Doppler velocity at a point P2 can be calculated as $$VDOPP = 2*\pi*S*R*\sin[2*\arcsin((n1/n2)*\sin(AI))-AI]$$

The moment at which the target first becomes visible is when the incident signal reaches point P1 at an angle reaching 90 degrees. The refracted angle at this position is AR=arcsin [(n1/n2)*sin(90)] which is approximately AR=arcsin(1/n2). The angle A2 of the corresponding target position P2 for this incidence is the boundary of the visibility or magnification zone of the lens.

For example, for a golf ball with relative dielectric constant of 3.24 and corresponding refractive index n2 of 1.8, the angle A2 for the extreme incident angle of 90 degrees is calculated as $$A2 = 2*AR - AI$$
$$= 2*56.25 - 90 \text{ degrees}$$
$$= 22.5 \text{ degrees}$$

Where AR was calculated from $$AR = \arcsin[(n1/n2)*\sin(AI)]$$
$$= \arcsin[(1/1.8)*\sin(90)]$$
$$= 56.25 \text{ degrees}$$

The Doppler velocity at the point P2 is calculated as $$VDOPP = 2*\pi*S*R*\sin[2*\arcsin((n1/n2)*\sin(AI))-AI]$$
$$= 2*\pi*50*0.021*\sin[2*\arcsin((1/1.8)*\sin(90))-90]$$
$$= 2.52 \text{ meters per second}$$

The Doppler velocity component along the line from the radar to the ball changes over time. FIG. 3 illustrates a golf ball 31 with a linear forward velocity 32 and rotational velocity, or spinning motion, 33. A feature 35 on the ball surface has a tangential velocity 38 calculated from the spin rate 33 and the ball radius 34. At this position, the Doppler speed component of the target 39 can be determined from the geometry and from the ball's refraction index value. This Doppler speed component is time varying. Initially it is in the same direction as the ball's linear forward velocity 32. When the feature 35 reaches the furthest opposing point on the ball, the Doppler speed component 39 will become zero. As the ball continues to rotate, the feature 35 will develop a Doppler velocity component 39 in a direction opposite to the ball's linear forward velocity 32. Overall, the time-varying Doppler shift caused by feature 35 will add to (be superimposed on) the Doppler shift from the linear forward velocity 32.

Marking a Golf Ball

It may be advantageous to deliberately mark the surface of a golf ball with a modulation-producing feature. This may be to enhance the amount of modulation of the reflected signal during measurement, so that the modulation can be more readily detected and measured.

One such form of marking may be one or more small pieces of conductive material glued to the ball surface. Another form of marking could be to use a non-conductive material but with a relative dielectric constant substantially different from that of the ball material. Another form of marking may be to embed the marker(s) under the skin of the ball during manufacture.

It may be advantageous to deliberately mark the surface of a golf ball with a modulation-producing feature. One such form of marking may be one or more small pieces of conductive material glued to the ball surface. Another form of marking could be to use a non-conductive material but with a relative dielectric constant Separating a Second Modulating Signal FIGS. 13A through 13E illustrate how a first modulating signal m1($t$) (FIG. 13E) can be modeled as a signal p(t) (FIG. 13C) which is a product of a block signal m2($t$) (FIG. 13B) and a sinusoidal signal s(t) (FIG. 13A) to which unwanted noise n(t) (FIG. 13D) is added:

$$m1(t)=p(t)+n(t)=s(t)*m2(t)+n(t)$$

The product signal p(t) represents the periodic fluctuations caused by the ball spin, and the other n(t) is the unwanted time-varying fluctuations that are generally considered as noise and that masks the wanted spin induced periodic fluctuations. They combine by simple addition:

$$m1(t)=p(t)+n(t).$$

The fluctuations p(t) are oscillatory variations that occur usually once or twice per ball rotation. Practical measurements show these variations to approximate a single period sinusoid, repeated at a rate related to the ball spin. A notable characteristic of an observable variation is that its period is substantially shorter than the ball's rotation period, a factor explained by the ball lens action that makes a target highly visible for only a part of a spinning ball's rotation.

From the theory of signals, p(t) can be considered as the product of two signals s(t)*m2($t$).

To illustrate this, assume s(t) to be a continuous sinusoidal signal oscillating with a period of the wavelet, and the second signal m2($t$) to be a block shaped signal with period related to the ball spin rate. If the continuous signal is not a sinusoid but has another wave shape that is nonetheless repetitive this difference does not affect the analysis as s(t) can then be taken as the fundamental harmonic of the continuous signal.

The amplitude of the second signal m2($t$) varies between 0 and 1, it has a phase where amplitude changes from 0 to 1 at the same time as the continuous signal s(t) changes polarity. In addition, its duty cycle is such that its amplitude remains at level 1 for exactly or approximately the period (one complete oscillation) of the continuous signal, otherwise the amplitude is 0.

The product of these two signals is a sinusoidal signal amplitude-modulated by the block signal.

From the above it is evident that the spin rate of the ball is contained in the period or frequency of the signal m2($t$), and not in the product signal p(t). Therefore, ball spin rate measurement includes a second demodulation step to separate m2($t$) from s(t). Amplitude demodulation and band pass filtering is one method that can be used to separate m2($t$) from the other components.

Figure 14A:
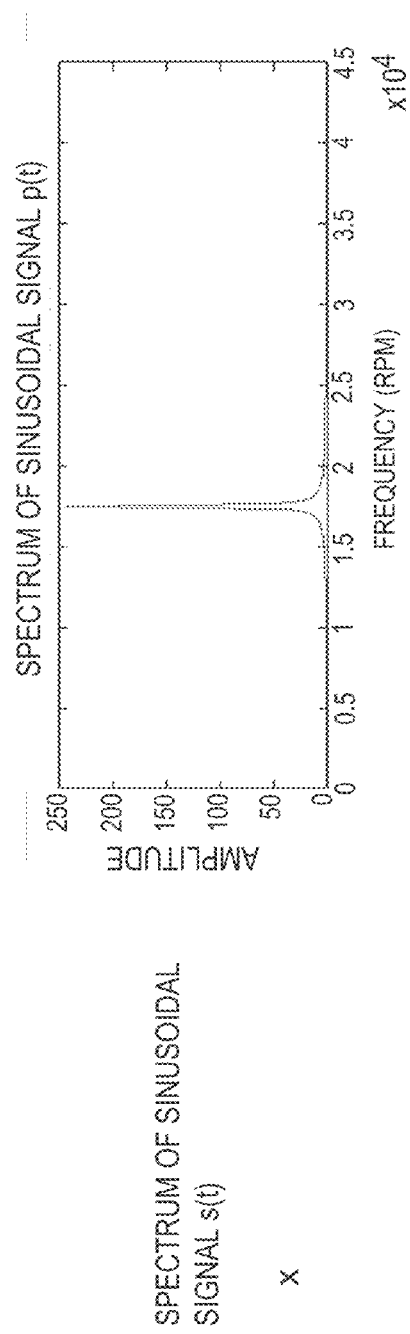
Figure 14B:
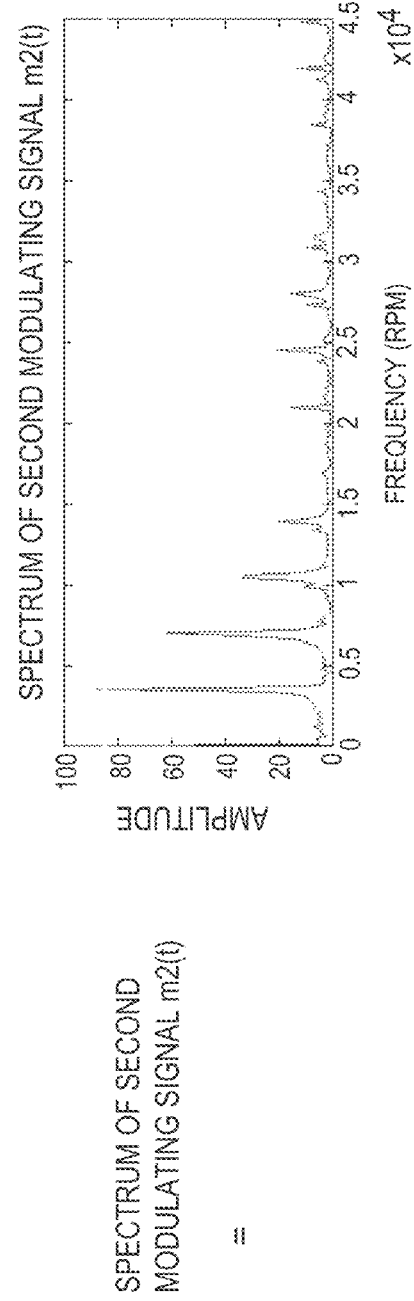
Figure 14C:
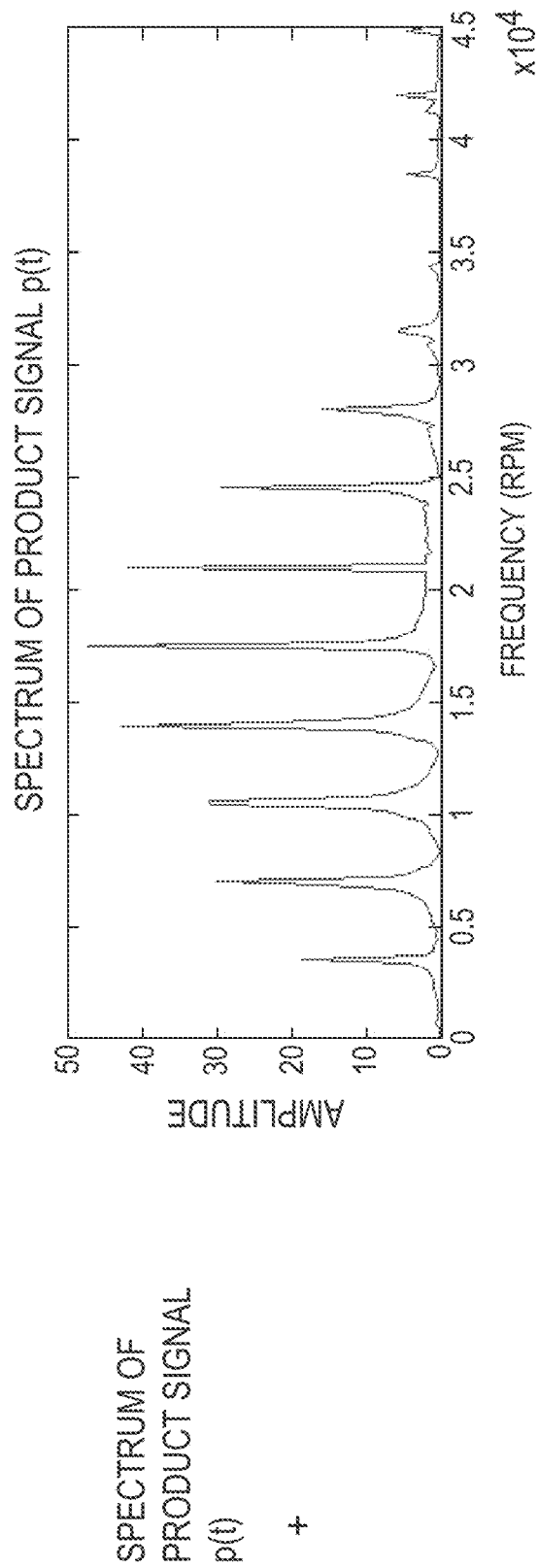
Figure 14D:
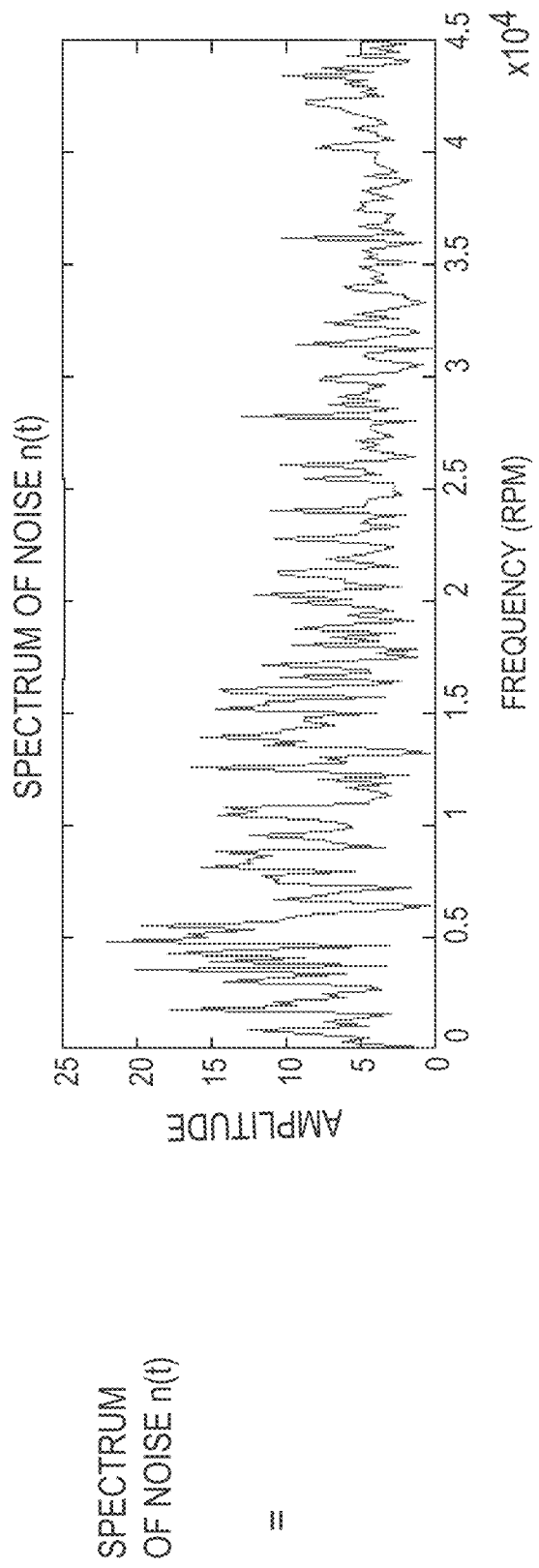
Figure 14E:
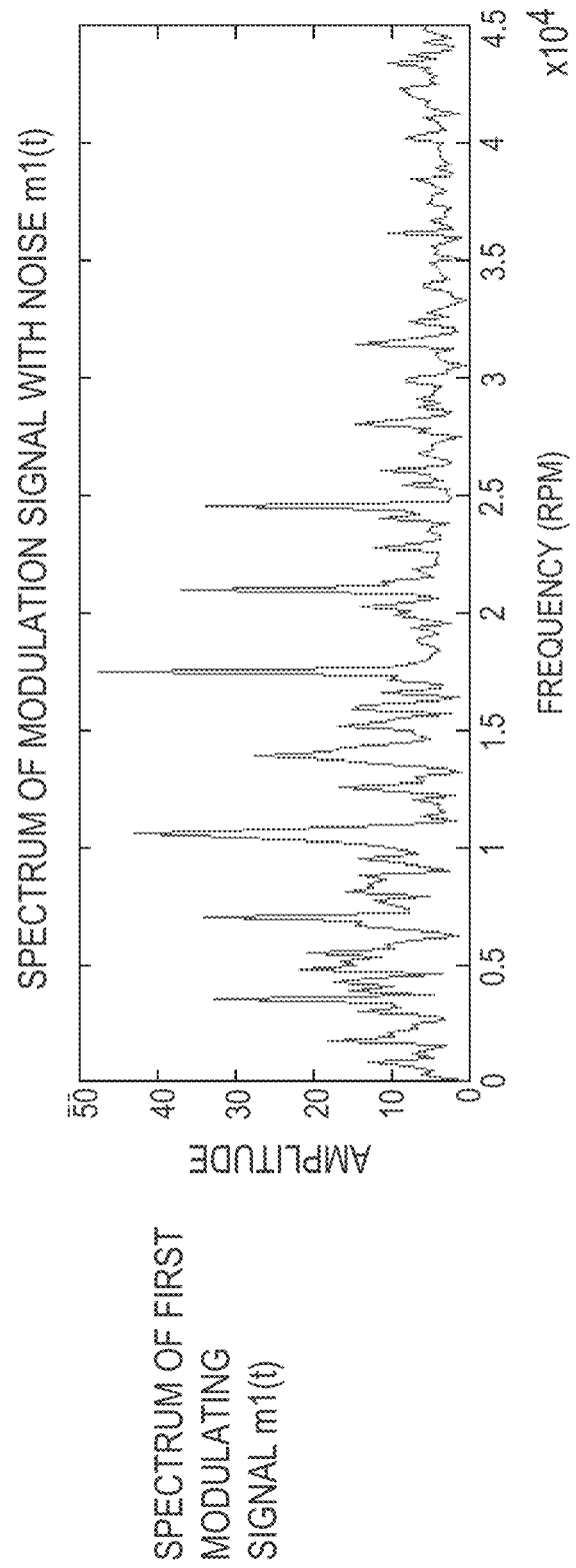

FIGS. 14A through 14E illustrate the frequency spectrums produced by frequency analysis of the various components and combinations of these signals. The product signal p(t) (FIG. 14C) has harmonics centered around the frequency of the sinusoidal signal s(t) (FIG. 14A). This is not directly related to the ball spin frequency. Sidebands will however also be present in the spectrum around this frequency. According to known theories of amplitude modulation, these sidebands will be spaced at multiples of the frequency of the second modulating signal m2($t$) (FIG. 14B), which is related to the ball spin rate. It is therefore clear that a second demodulation step can separate the second modulating signal m2($t$) from the product signal before the ball spin frequency can be measured. If this is not done, the frequency of the wavelet, which is an artifact of the ball lens action, will cause harmonics not related to the ball spin rate.

Additional Disclosure of the Apparatus and Process Pertaining to Embodiments of the Invention Doppler radar with at least one receiver channel First demodulator (as one alternative it can be implemented in the Processor, and as another alternative this can be a separate system)

Second amplitude demodulator (as one alternative it can be implemented in the Processor, and as another alternative this can be a separate system)

Signal filter (as one alternative it can be implemented in the Processor, and as another alternative this can be a separate system)

Processor

Launch the golf ball

Receive reflected Doppler signals from a spinning ball

Demodulate the Doppler signal to discriminate the first modulation signal

Filter the first modulation signal to favor signals with shape, duration and polarity consistent with ball lens action Demodulate the first modulated signal to produce a second modulating signal (optional)

Demodulate the filtered signal to produce a second modulating signal (optional)

Perform frequency analysis on the filtered signal

Perform frequency analysis on the second modulating signal

Calculate the ball spin rate using ball spin rules

Output spin value

Output device

Store spin value

Data storage device

With reference to FIG. 4, a system configured to determine the spin rate of a golf ball (or other projectile) comprises a Doppler radar 410, a first demodulator 411, a second demodulator 414, a processor 412, a signal filter 413, and an output device 415. Although six components are named, it is understood that one or more components can be combined into a fewer number of components (e.g., processor 412 is provided within output device 415, or first and/or second demodulators 411, 414 is included in processor 412) and/or a larger number of components (e.g., transmitter and receiver of Doppler radar 410 are separately provided). The components can communicate with each other via a wired or wireless connection. For example, one or more components may form part of an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Figure 10:
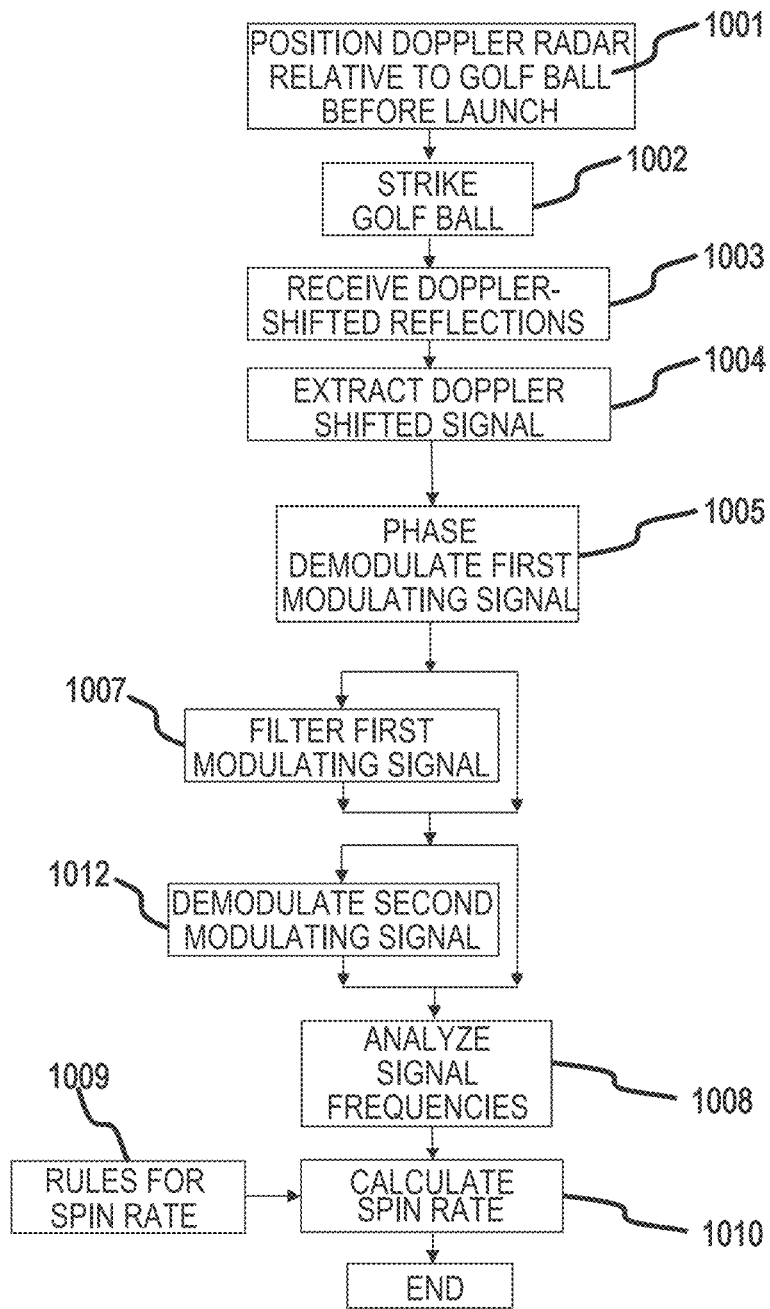
FIG. 10 is a block diagram illustrating operations in a method, in accordance with example embodiments.

With reference to FIG. 4 and FIG. 10, a Doppler radar 410 is used to measure the trajectory 46 of a golf ball 45 for at least an initial part of its flight path. The radar 410 comprises a transmitter and receiver that may be co-located with or remote from each other. The radar 410 is set up in a position that gives it an advantageous view of the launch and flight path of the ball, such as behind the tee. The golf ball is launched by striking it with a golf club. The radar receives the reflected signals from the golf ball, and extracts the Doppler signal by multiplying the received signal with a copy of the transmitted signal and low-pass filtering the response.

The First Demodulator 411 detects variations in the phase and/or amplitude of the Doppler signal and produces a First Modulating signal. The First Modulating Signal includes the periodic variations caused by the spinning motion of the ball and especially the characteristic variations resulting from the ball lens effect.

A Signal Filter 413 enhances or detects the characteristic variations in the First Modulating Signal utilizing the expected or known polarity and shape of the variations, producing a Filtered Signal from the First Modulating signal. The Signal Filter 413 performs one or more filtering operations on at least a portion of the First Modulating signal. Example filtering include, but is not limited to, signal sampling, band-pass filtering, band-limited filtering, correlation processing, frequency, pulse or wavelet transforms, and the like.

A Second Demodulator 414 detects a Second Modulating Signal from the Filtered Signal that is output from the Signal Filter 413. In some embodiments, the Second Modulating Signal is optional.

The Processor 412 performs a frequency analysis of either the Second Modulating Signal (if available) or the Filtered Signal that is output from the Signal Filter 413 (if the Second Modulating Signal is not available).

The frequency analysis may be a simple fast Fourier transform (FFT) calculation to determine frequencies and magnitudes from the demodulated signal, or may be use alternative analysis methods such as wavelet transforms or pulse transforms that exploit the known or expected characteristics of the Filtered Signal or of the Second Modulating signal.

The Processor 412 also performs additional tests and calculations on the results of the frequency analysis to identify the spin rate of the golf ball. Prior known and related measured information can also be used to determine the golf ball spin rate. Prior information can include knowledge of the golf club used, the expectation that modulation frequencies occur at twice the ball spin rate due to the seam and ball lens action, and/or measured club and ball data such as ball launch speed and vertical launch angle.

The determined spin value is output to an output device 415 (e.g., screen, memory, database, mobile device, communication device, computer, cell phone, smartphone, tablet, and the like). The spin value can also be stored for later utilization.

A Doppler radar 410 tracks a golf ball 44, 45 launched from a tee and traveling along its flight path 46.

The radar is positioned approximately behind the tee and for most of the time the golf ball will travel approximately away from the radar.

Ball spin 49 is caused by the golf club strike.

The radar signal is transmitted towards the ball 47 and reflected from the ball 48.

The received signal will exhibit Doppler shift due to the motion of the ball. The radial speed of the ball relative to the radar will be the primary contributor to the Doppler shift. The Doppler shift will also be affected by the spinning motion of the ball. This includes spreading of the Doppler shift around the average, and periodic modulation effects are caused by non-homogeneities on the ball such as dimples, seam, and markings. Both phase and amplitude modulation will occur.

The ball possesses characteristics that can be exploited to enhance the measurement of modulation signals to extract the ball spin rate.

The first characteristic of importance is that the ball acts as a lens for the microwave signals of the Doppler radar. The lens magnifies the reflective characteristics of local features on or near the ball surface, causing detectable phase and amplitude modulation of the Doppler signal.

The modulation effect due to the lens action is also unique in that the apparent Doppler speed increases momentarily after which it decreases before returning to the average traversing ball speed. This polarity feature can be used to identify the desired modulation signals in the presence of other unwanted variations.

The lens action also causes the modulation to occur time-wise when the feature causing the modulation is on the far side of the ball away from the radar. This temporal characteristic can be used to discriminate between the desired modulation signal and unwanted variations that occur at other times during the ball's rotation.

In addition, the duration of the modulation effect is limited to the time when the modulating feature traverses the magnifying zone on the ball which may typically be in the order of 10-25% of the overall spin period. This feature is also used by the signal filter 413 and/or the processor 412 to discriminate between the desired modulation signal and other unwanted variations.

These characteristics, namely the relative temporal position, the time duration, and the polarity of the modulation are unique characteristics of the modulation that are used to discriminate against other signal variations that mask or reduce the visibility of the desired modulation signals.

The ball seam can be chosen as the primary feature of the ball for spin frequency measurement. If the ball seam does not provide a sufficient modulation effect, the ball may be deliberately marked with a reflective feature as discussed before.

Even if no control is exercised to orientate the seam (if this is the chosen modulating feature) when teeing up a golf ball, there is a statistically good probability that, after launch, the ball will spin on an axis relative to the radar and the seam in a way that a part of the seam will modulate the reflected Doppler signal. This is supported by experimental results. The optimum transit point of the seam is the far side of the ball where the lens action will magnify the modulation response of the seam. In addition, the seam will, unless perfectly perpendicular to the spin axis, cause a modulation effect twice per ball rotation. This factor can be exploited when measuring the ball spin rate.

The receiver will receive the signal reflected from the ball 1003 which contains a component related to the apparent translational speed of the ball and components that include the spin-induced modulation as well as other random fluctuations and noise.

The receiver will detect the Doppler shifted signal 1004, including the translational and oscillatory signals as described above, by mixing the received signal with a signal derived from the transmitted signal, and retaining the difference signal.

This signal is demodulated 1005 using a for example a phase-locked loop detector to extract the phase variations as a function of time. This demodulated signal is then subsequently analyzed using any preferred frequency analysis method or tool such as fast Fourier transform to determine the amplitude and frequency of periodic components in the demodulated signal, one component being the modulation from the ball seam with a fundamental rate which is twice the ball spin rate. Other methods of demodulation may alternatively be used.

Because the phase modulation signal period is a fraction of the ball rotation period, higher order harmonics of the fundamental rate is also expected. Hence the main responses searched for are harmonics at even multiples of the ball spin rate.

In addition, the modulation signal can be further analyzed to favor modulation signal shapes that have a shape, duration and polarity consistent with that caused by the ball lens effect. This is analogous to inter alia the principles wavelet analysis, and provide a means to better distinguish between desired modulation signals and other random or unwanted effects or noise.

Embodiments of the invention can be implemented using any Doppler radar designed to measure the motions of a moving body, for example, golf launch monitors and ball-tracking systems.

A suitable Doppler radar 410 is equipped with at least one receiver to measure the Doppler shifted signal reflected from a launched golf ball. The radar can be a continuous wave type operating in the microwave band between 9 and 35 GHz and transmitting approximately 10 milliwatts of power.

A practical golf ball should contain at least one feature that will cause time-varying fluctuations in the Doppler signals reflected from the ball. These variations will cause phase and amplitude modulation of the Doppler signal at a periodic rate related to the ball spin.

A practical golf ball is also manufactured with a core comprising an elastomer such as resin acrylate that contributes to the ball being able to act as a dielectric ball lens to amplify the size and motion of any feature on the far side of the ball relative to the radar.

The Doppler signal received by the radar is passed to a First Demodulator (e.g., Demodulator 411) to detect the changes in the phase and amplitude of the Doppler signal 1005. The output of this First Demodulator is the First Modulating Signal.

The expected characteristics of the First Modulating Signal can be exploited in a further filtering step 1007 in a Signal Filter 413 to discriminate between wanted signals and unwanted signals, also called noise. The Signal Filter 413 may perform any known form of signal processing including but not limited to signal sampling, band-pass filtering, correlation processing, or frequency, pulse or wavelet transforms.

This output of the Signal Filter 413 is a Filtered Signal.

A Second Demodulator 414 may be used to amplitude-demodulate the Filtered Signal 1012 to produce a Second Modulating Signal.

Either the Filtered Signal or the Second Modulating Signal can be sampled and processed by a processor 412. The processor is programmed to perform frequency analysis 1008 using for example the fast Fourier transform (FFT) or any other analysis method able to determine the existence and frequency of periodic variations of golf ball spin, typically between 1,000 and 15,000 revolutions per minute.

The processor applies additional rules 1009 to favor signals that have rates of multiples of the golf ball spin rate, for example if the seam of the ball provides two modulation effects per rotation.

The processor can also analyze the signal 1008 to favor parts of the signal with a phase change pattern consistent with an initial increase in apparent ball velocity followed shortly thereafter by a decrease in ball velocity, and this pattern occupying only a fraction of the time period of one rotation that corresponds to the time that the target on the ball that causes the modulation is magnified by the ball lens effect.

The determined spin value can be output to an output device and/or stored in a storage device for later utilization.

In this manner, a Doppler radar measures the Doppler shifted signal reflected from a launched golf ball. The radar is positioned approximately behind the tee and for most of the time the golf ball will travel approximately away from the radar.

The Doppler signal received by the radar is passed to a Phase and/or Amplitude Demodulator to detect the changes in the phase and amplitude of the Doppler signal. This time varying demodulated signal (which may be additionally filtered and/or demodulated) is sampled and processed by a data processing device programmed to perform frequency analysis to measure the frequency of periodic variations related to golf ball spin. The processor also applies rules to favor harmonic signals with harmonic rates that are even multiples of the golf ball spin rate, and to favor parts of the signal with a phase change pattern consistent with the ball acting as a lens to magnify the modulating response of the ball seam or other non-homogeneous feature on or near the ball surface.

In other embodiments, the system and methodology described herein can be used to measure the spin rate of other sports balls or projectiles in general that have dielectric properties that magnifies the modulating effect on the reflected Doppler signal from a feature of the ball or projectile, respectively.

Figure 11:
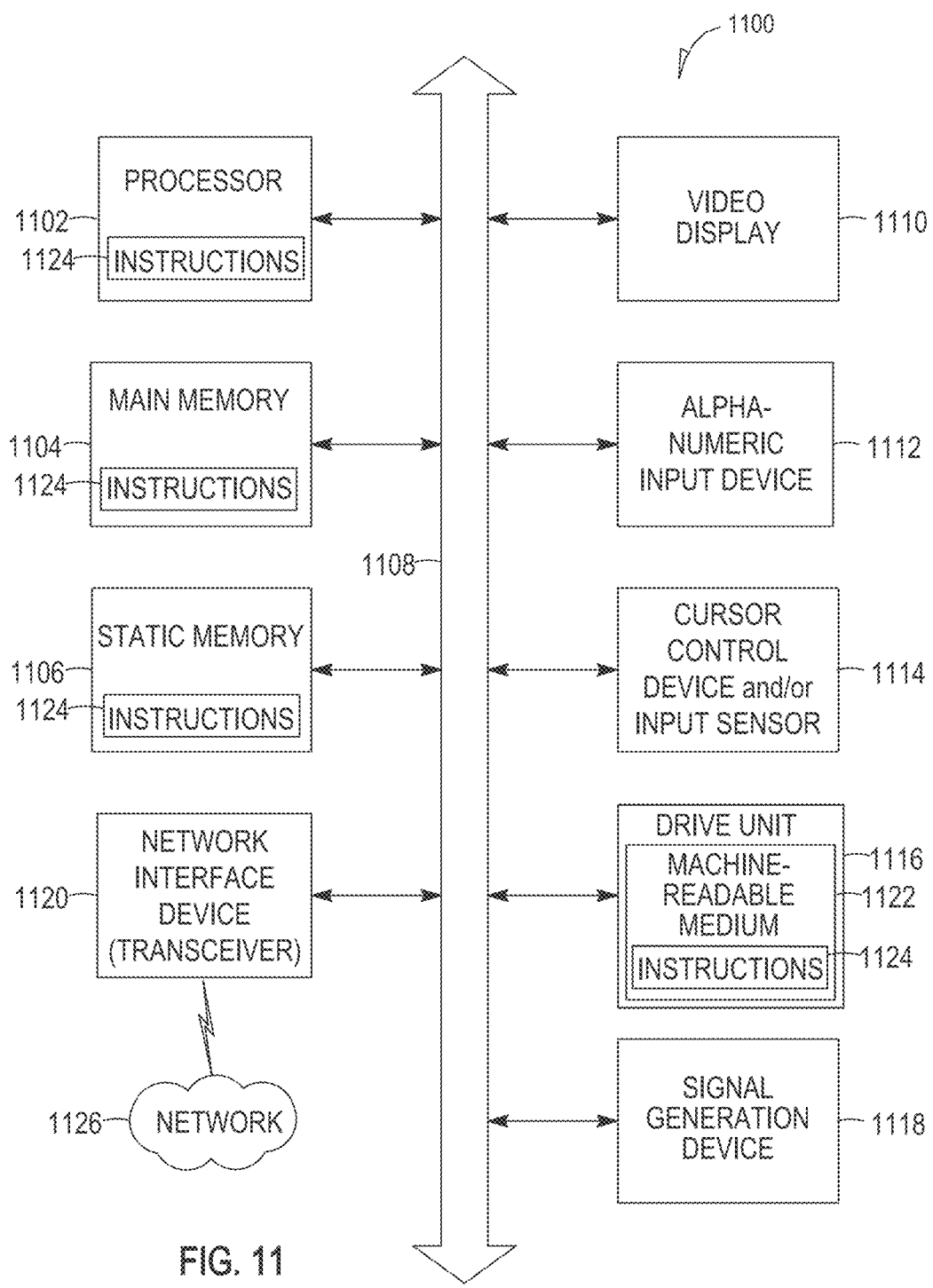
FIG. 11 is a block diagram of a machine in the example form of a computer system within which a set of instructions may be executed for causing the machine to perform any one or more of the methodologies herein discussed, in accordance with example embodiments.
Figure 13C:
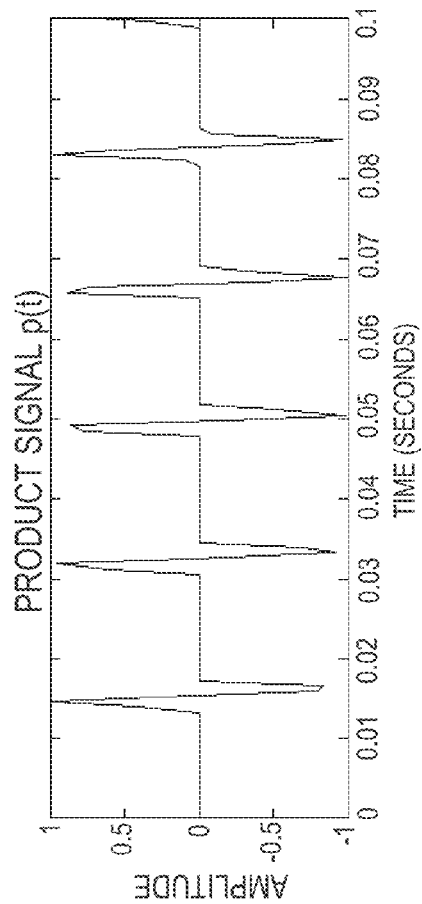
Figure 13D:
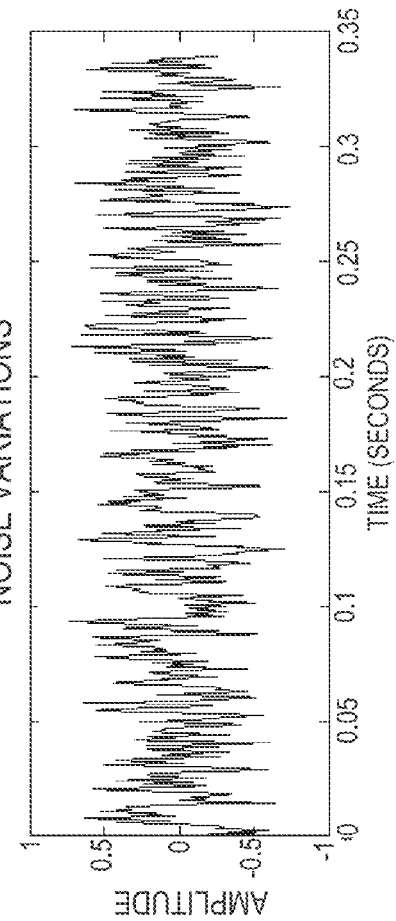

FIG. 11 shows a diagrammatic representation of a machine in the example form of a computer system 1100 within which a set of instructions, for causing the machine to perform any one or more of the methodologies discussed herein, may be executed. The computer system 1100 comprises, for example, any of the Doppler radar 410, first demodulator 411, signal filter 413, second demodulator 414, processor 412, or output device 415. In alternative embodiments, the machine operates as a standalone device or may be connected (e.g., networked) to other machines. In a networked deployment, the machine may operate in the capacity of a server or a device machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104 and a static memory 1106, which communicate with each other via a bus 1108. The computer system 1100 may further include a video display unit 1110 (e.g., liquid crystal display (LCD), light emitting diode (LED), touch screen, or a cathode ray tube (CRT)). The computer system 1100 also includes an alphanumeric input device 1112 (e.g., a physical or virtual keyboard), a cursor control device 1114 (e.g., a mouse, a touch screen, a touchpad, a trackball, a trackpad), a disk drive unit 1116, a signal generation device 1118 (e.g., a speaker) and a network interface device 1120.

The disk drive unit 1116 includes a machine-readable medium 1122 on which is stored one or more sets of instructions 1124 (e.g., software) embodying any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

STATEMENTS

1. A method of determining a spin rate of a projectile, the method comprising receiving a reflected signal of microwave radiation incident on the projectile during a rotational trajectory of the projectile, the projectile including a non-homogeneous feature at or near a surface of the projectile; detecting, by at least one processor, modulation of the reflected signal attributable to the feature; and calculating the spin rate of the projectile based on the detected modulation.

2. The method of claim 1, wherein the reflected signal comprises a Doppler radar reflection signal.

3. The method of any of claims 1 to 2, wherein the projectile comprises a sport ball.

4. The method of any of claims 1 to 3, wherein the projectile comprises a golf ball.

5. The method of any of claims 1 to 4, wherein the feature comprises a seam, a signage, or a manufacturing occurring feature.

6. The method of any of claims 1 to 5, wherein the detection of the modulation comprises detecting an increase in an amplitude of the reflected signal at a first time during a period of rotation of the projectile and a decrease in the amplitude of the reflected signal at a second time during the period of rotation of the projectile.

7. The method of any of claims 1 to 6, wherein the detection of the modulation comprises detecting a delay in a phase of the reflected signal at a first time during a period of rotation of the projectile and an advance in the phase of the reflected signal at a second time during the period of rotation of the projectile.

8. The method of any of claims 6 to 7, wherein a time period defined by the first and second times corresponds to the feature being located on a far side of the projectile relative to a source of the microwave radiation.

9. The method of claim 8, wherein the time period is less than half the period of rotation of the projectile.

10. The method of any of claims 1 to 9, wherein the spin rate is a function of a refraction index of a material included in the projectile.

11. The method of claim 10, wherein the material comprises a dielectric material.

12. The method of claim 10, wherein the material comprises a core material of the projectile.

13. The method of any of claims 10 to 12, wherein the detection of the modulation comprises detecting a magnifying effect of the feature by the material behaving as an optical lens.

14. The method of any of claims 1 to 13, wherein the calculating of the spin rate comprises using integer multiples of a periodic modulation frequency of the detected modulation.

15. The method of any of claims 1 to 14, wherein the detecting of the modulation of the reflected signal produces a first demodulated signal, and further comprising filtering the first demodulated signal to produce a filtered signal prior to the calculating of the spin rate.

16. The method of claim 15, wherein the calculating of the spin rate is based on the filtered signal.

17. The method of claim 15, further comprising demodulating the filtered signal to produce a second demodulated signal, wherein the calculating of the spin rate is based on the second demodulated signal.

18. The method of claim 15, wherein the filtering of the first demodulated signal comprises at least one of signal sampling, band-pass filtering, band-limited filtering, correlation processing, frequency transforms, pulse transforms, or wavelet transforms.

19. The method of any of claims 1 to 18, wherein the calculating of the spin rate comprises frequency analysis.

20. A system, comprising a Doppler radar configured to receive a reflected signal of microwave radiation incident on a projectile during a rotational trajectory of the projectile, the projectile including a non-homogeneous feature at or near a surface of the projectile; a demodulator in communication with the Doppler radar and configured to process the reflected signal to identify modulation of the reflected signal attributable to the feature; and at least one processor in communication with the demodulator and configured to calculate a spin rate of the projectile based on the identified modulation.

21. The system of claim 20, wherein the system is configured to perform operations of any of claims 1 to 19.

22. The system of any of claims 20 to 21, further comprising a filter to receive a first demodulated signal from the demodulator and configured to filter the first demodulated signal to output a filtered signal.

23. The system of claim 22, wherein the at least one processor is configured to calculate the spin rate using the filtered signal.

24. The system of claim 22, further comprising a second demodulator configured to output a second demodulated signal based on the filtered signal.

25. The system of claim 24, wherein the at least one processor is configured to calculate the spin rate suing the second demodulated signal.

26. The system of any of claims 20 to 25, further comprising an output device in communication with the at least one processor, the output device configured to store or display the calculated spin rate.

27. The system of claim 26, wherein the output device is in wired communication with the at least one processor.

28. The system of claim 26, wherein the output device is in wireless communication with the at least one processor.

NON-LIMITING EMBODIMENTS

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for determining a spin rate of a projectile in flight, the system comprising:
    a signal transmitter to transmit a microwave signal toward the projectile in flight;
    a signal receiver to receive a reflected signal from the projectile in flight, the reflected signal caused by at least a portion of the microwave signal incident on the projectile in flight;
    a signal mixer to mix the received signal with a comparison signal based on the transmitted microwave signal to yield a difference signal;
    a demodulator to demodulate the difference signal to generate a demodulated signal comprising at least one periodic component indicating phase variations between the received signal and the comparison signal; and a frequency analyzer to detect a first periodic component of the demodulated signal, the first periodic component including a first time portion indicating a first apparent speed of the projectile greater than a nominal speed of the projectile, and including a second time portion indicating a second apparent speed of the projectile less than the nominal speed of the projectile, the frequency analyzer to determine a period of the first periodic component, and to determine the spin rate of the projectile in flight based on the period of the first periodic component.

2. The system of claim 1, the first periodic component generated by rotation of a structural feature of an outer layer of the projectile in flight, the structural feature extending along an equator of the projectile in flight, and the frequency analyzer to determine the spin rate as corresponding to a period equal to an even multiple of the period of the first periodic component.

3. The system of claim 2, the structural feature comprising a seam at which two cover half-shells of a golf ball are coupled together to cover a core of the golf ball, the core operating as a lens to create a magnifying zone for the reflected signal, the increase and decrease in the apparent speed caused by the seam passing through the magnifying zone.

4. The system of claim 1, the first periodic component generated by rotation of a feature coupled to a cover covering a core of a golf ball, and the frequency analyzer to determine the spin rate as having a period equal to the period of the first periodic component.

5. The system of claim 4, the feature comprising a conductive marker, the core operating as a lens to create a magnifying zone for the reflected signal, the increase and decrease in the apparent speed caused by the conductive marker passing through the magnifying zone.

6. The system of claim 1, the signal transmitter comprising a transmitter for a Doppler radar system, and the signal receiver comprising a receiver for the Doppler radar system.

7. The system of claim 1, further comprising:
a signal filter to filter the demodulated signal to yield a filtered signal, the signal filter comprising at last one of a signal sampler, a band-pass filter, and a band-limiting filter, the frequency analyzer to detect the first periodic component in the filtered signal.

8. The system of claim 1, the demodulator comprising a first demodulator, the system further comprising a second demodulator to demodulate the filtered signal to produce a second demodulated signal, the frequency analyzer to detect the first periodic component in the second demodulated signal.

9. The system of claim 1, the frequency analyzer to perform a fast Fourier transform to detect the first periodic component.

10. The system of claim 1, the frequency analyzer to detect the first periodic component of the demodulated signal based on at least one rule associated with a physical configuration of the projectile in flight.

11. The system of claim 1, further comprising a low-pass filter to filter the difference signal, the demodulator to demodulate the filtered difference signal.

12. The system of claim 1, the comparison signal having a frequency equal to a frequency of the transmitted microwave signal.

13. The system of claim 1, the projectile in flight traveling away from the transmitter and the receiver, the first time period occurring immediately before the second time period during the period of the first periodic component.

14. The system of claim 1, the sum of the first time period and the second timer period being less than the period of the first periodic component.

15. A method of determining a spin rate of a projectile in flight, the method comprising:
transmitting a microwave signal toward a projectile in flight;
receiving a reflected signal from the projectile in flight, the reflected signal being a reflected portion of the microwave signal incident on the projectile in flight;
mixing the received signal with a comparison signal based on the transmitted microwave signal to yield a difference signal;
demodulating the difference signal to generate a demodulated signal comprising at least one periodic component indicating phase variations between the received signal and the comparison signal;
detecting a first periodic component of the demodulated signal, the first periodic component comprising a repeating bipolar pulse having a first portion during which an apparent speed of the projectile is greater than a preceding speed of the projectile, the bipolar pulse having a second portion during which the apparent speed of the projectile is less than the preceding speed of the projectile;
determining a period of the first periodic component; and
determining the spin rate of the projectile in flight based on the period of the first periodic component.

16. The method of claim 15, a period of the spin rate of the projectile in flight being an even multiple of the period of the first periodic component based on the projectile in flight comprising a signal-reflective feature forming a loop about the projectile in flight.

17. The method of claim 15, a period of the spin rate of the projectile in flight being equal to the period of the first periodic component based on the projectile in flight comprising a signal-reflective feature not forming a loop about the projectile in flight.

18. A system for determining a spin rate of a projectile in flight, the system comprising:
at least one hardware processor; and
a memory including instructions that, when executed by the at least one hardware processor, cause the system to perform operations comprising:
receiving a phase-demodulated difference signal of a projectile in flight from a Doppler radar system;
detecting a first periodic component of the phase-demodulated signal, the first periodic component comprising a plurality of bipolar pulses, each of the plurality of bipolar pulses having a first portion during which an apparent speed of the projectile is greater than a nominal speed of the projectile between consecutive ones of the bipolar pulses, and each of the plurality of bipolar pulses having a second portion during which the apparent speed of the projectile is less that the nominal speed of the projectile between consecutive ones of the bipolar pulses;
determining a period of the first periodic component; and
determining the spin rate of the projectile in flight based on the period of the first periodic component.

19. The system of claim 18, the determining of the spin rate of the projectile in flight being based in part on at least one rule relating the spin rate of the projectile in flight to the period of the first periodic component according to a configuration of a signal-reflective physical feature of the projectile in flight.

20. The system of claim 19, the operations further comprising correlating a point in time between the first portion and the second portion of each of the plurality of bipolar pulses with a at least a portion of the signal-reflective physical feature being positioned opposite the projectile in flight from the Doppler radar system.

* * * * *